April 11, 1944.　　　J. W. BRYCE　　　2,346,250
ACCOUNTING MACHINE
Filed Dec. 6, 1939　　　17 Sheets-Sheet 1

INVENTOR
James W. Bryce
BY
W. M. Wilson
ATTORNEY

April 11, 1944. J. W. BRYCE 2,346,250
ACCOUNTING MACHINE
Filed Dec. 6, 1939 17 Sheets-Sheet 2

INVENTOR
James W. Bryce
BY
ATTORNEY

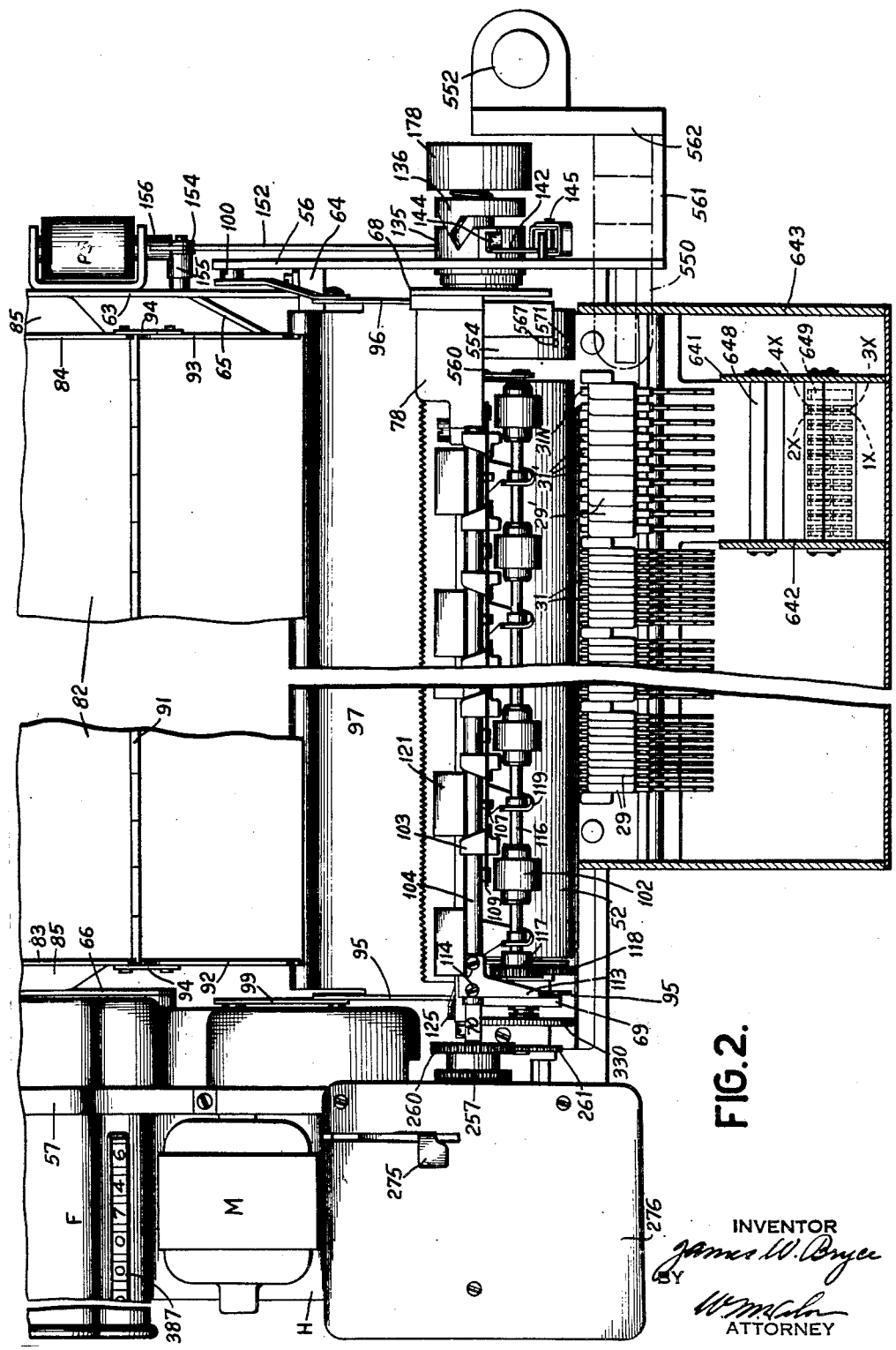

April 11, 1944. J. W. BRYCE 2,346,250
ACCOUNTING MACHINE
Filed Dec. 6, 1939 17 Sheets-Sheet 4
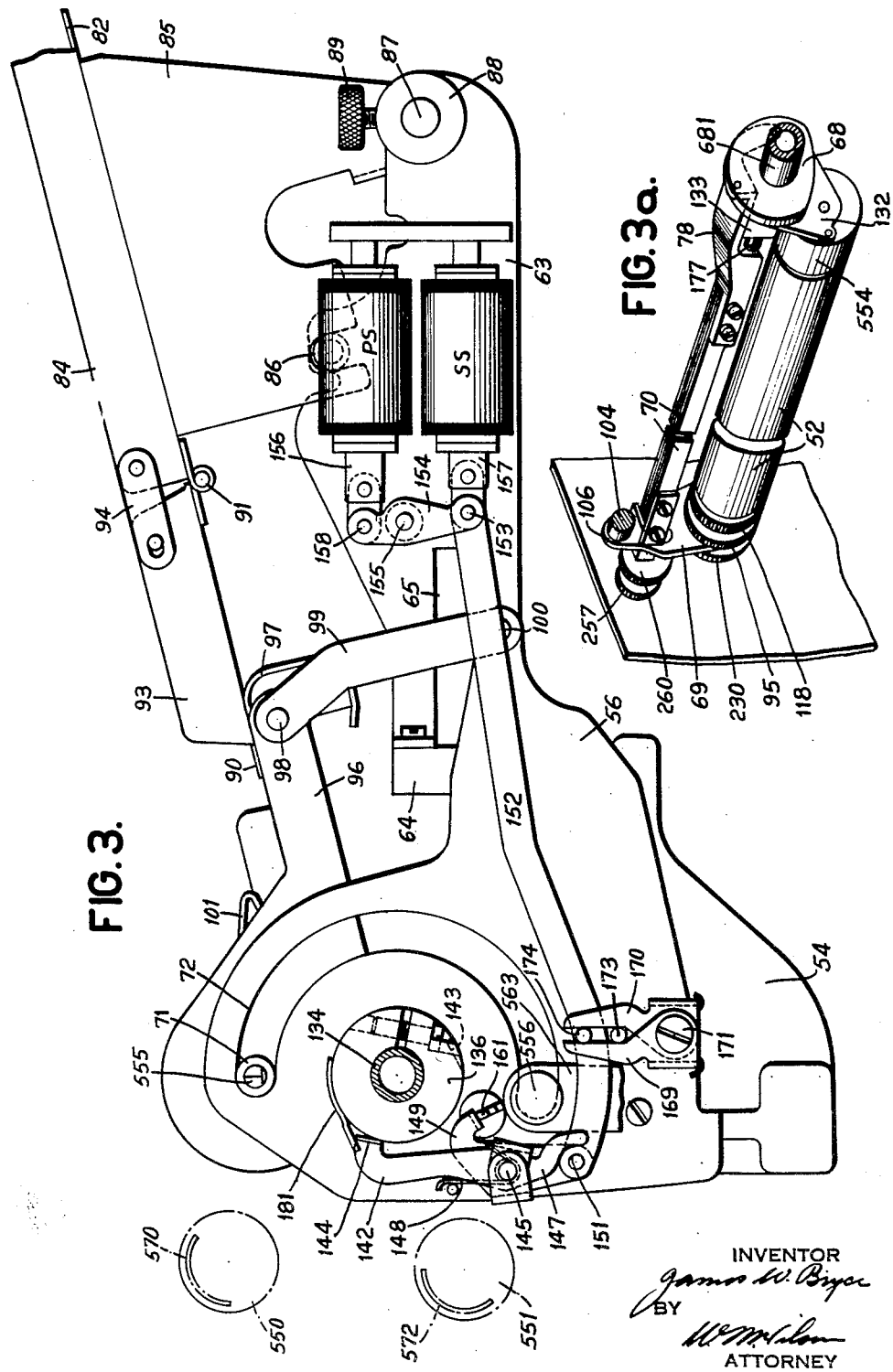

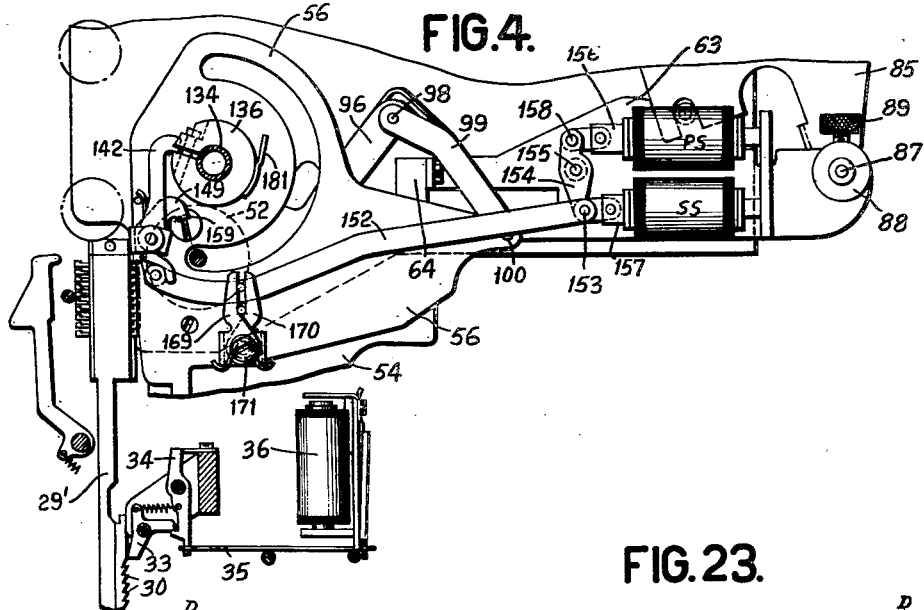
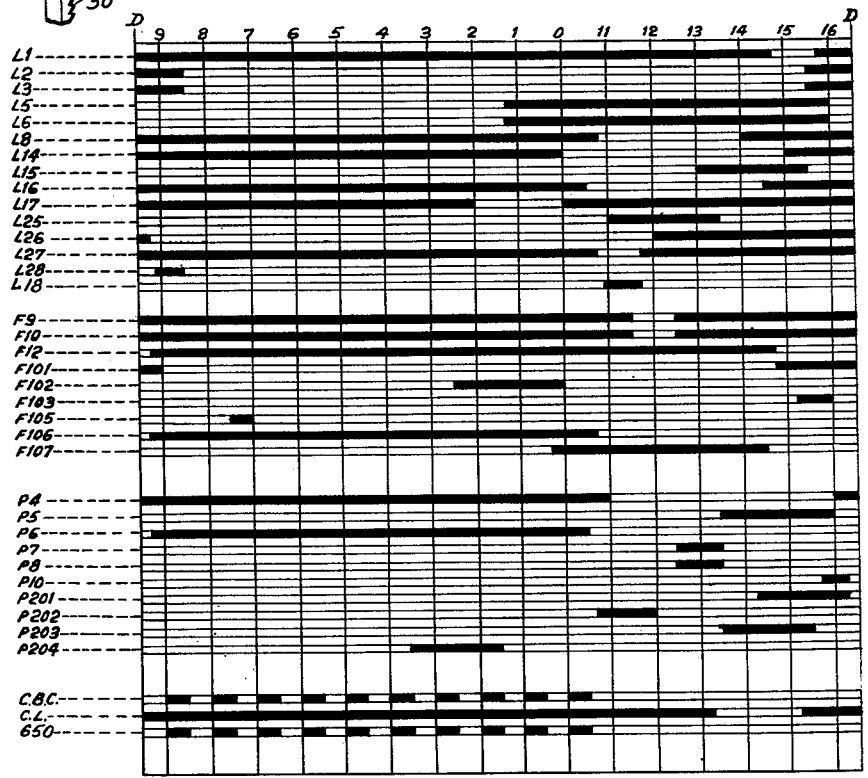

April 11, 1944.  J. W. BRYCE  2,346,250
ACCOUNTING MACHINE
Filed Dec. 6, 1939  17 Sheets-Sheet 6

INVENTOR
James W. Bryce
BY
ATTORNEY

April 11, 1944.  J. W. BRYCE  2,346,250
ACCOUNTING MACHINE
Filed Dec. 6, 1939  17 Sheets-Sheet 8

INVENTOR
James W. Bryce
BY
ATTORNEY

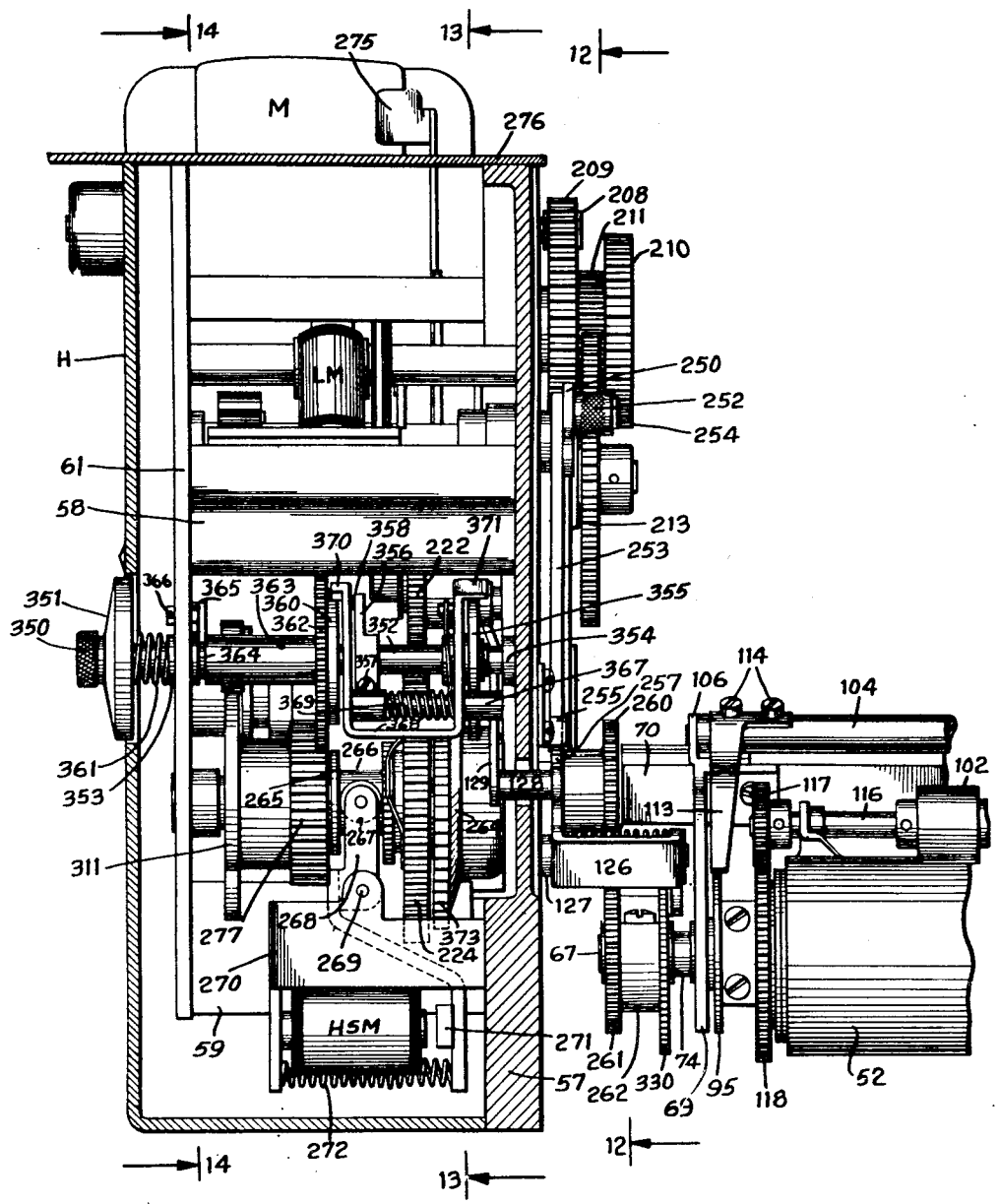

April 11, 1944.  J. W. BRYCE  2,346,250
ACCOUNTING MACHINE
Filed Dec. 6, 1939  17 Sheets-Sheet 10

INVENTOR
James W. Bryce
BY
ATTORNEY

April 11, 1944.    J. W. BRYCE    2,346,250
ACCOUNTING MACHINE
Filed Dec. 6, 1939    17 Sheets-Sheet 13

INVENTOR
James W. Bryce
BY
ATTORNEY

April 11, 1944. J. W. BRYCE 2,346,250
ACCOUNTING MACHINE
Filed Dec. 6, 1939 17 Sheets-Sheet 14

INVENTOR
James W. Bryce
BY
ATTORNEY

Patented Apr. 11, 1944

2,346,250

UNITED STATES PATENT OFFICE 2,346,250

ACCOUNTING MACHINE

James W. Bryce, Glen Ridge, N. J., assignor to International Business Machines Corporation, New York, N. Y., a corporation of New York Application December 6, 1939, Serial No. 307,740

8 Claims. (Cl. 235—61.9)

This invention relates generally to balance recording and reading devices and more specifically to balance entering mechanism coordinated with automatic ledger sheet feeding control, so that balance amounts may be represented in code on a ledger sheet and sensed thereon as the sheet reaches a posting position and thereby entered into an accumulator in which other items are added from record cards for the formation of a new balance. New balances are not only printed numerically, but also in code so that the sheet may be analyzed later when reinserted for the addition or subtraction of other items.

An object of the invention is the provision of code marking and photoelectric reading devices for representing and analyzing printed amounts.

Another object of the invention is the provision of improved automatic means for reading positive or negative old balance amounts and adding said amounts in an accumulator, so that other credit and debit amounts may be added thereto or subtracted therefrom to form a new balance amount.

A further object of the invention is the provision of controls for automatically coordinating balance printing, reading and accumulating devices with ledger sheet feeding controls. The devices are incorporated in a record controlled machine wherein the records are arranged in groups and group control devices detect changes in group designations on the records. After the entry of the last item associated with a certain ledger account, a group change is detected, a total printing cycle is initiated and the ledger sheet is ejected. Before ejection, the total or balance amount is printed numerically and represented in code below the series of item recordings on the sheet. Marginal feed control perforations are punched in the sheet as item entering takes place, and after the sheet is ejected, it may be reinserted and, through controls cooperating with said marginal perforations, be brought into the proper posting position wherein the code marks are analyzed before printing is resumed directly under the previously recorded old balance. Upon reinsertion, the sheet is brought to the posting position before the balance reading devices become effective, and they in turn, after completion of the balance reading and accumulating operation, call into operation the card feeding and item entering controls.

Another object of the invention is the provision of controls for suspending card feeding operations during ledger sheet feeding, balance reading and accumulating operations.

Another object of the invention is the provision of means for initiating a code reading operation as an incident to the location of a ledger sheet in a posting position.

A still further object of the invention is the provision of photoelectric devices for printing and reading a code mark designating the positive and negative nature of a balance, and controls operated thereby for conditioning an accumulator for adding or subtracting operations.

Other objects of the invention will be pointed out in the following description and claims and illustrated in the accompanying drawings, which disclose, by way of example, the principle of the invention and the best mode, which has been contemplated, of applying that principle.

In the drawings:

Fig. 2 is a plan view of the motor and feeding control mechanisms associated with the platen.

Fig. 3 is a right elevation view of the punch frame slide release and the punch operating mechanism, the parts being shown with the platen in a raised position.

Fig. 3a is an isometric view showing the manner in which the platen is attached to a pivoting member.

Fig. 4 is a right side elevation view of the punch operating mechanism with the platen in a lowered position.

Fig. 11 is a front elevation view of the head spacing and platen lifting mechanism with the front part of the housing broken away to show the connections to the left end of the platen.

Fig. 14 is a left elevation view in a section taken on line 14—14 in Fig. 11 and showing the indicating, line spacing and platen lifting mechanisms.

Fig. 15 is a detail view of a section taken along the left end of the platen lifting bar.

Fig. 23 is a timing diagram of the operating controls of the machine.

Figure 1:
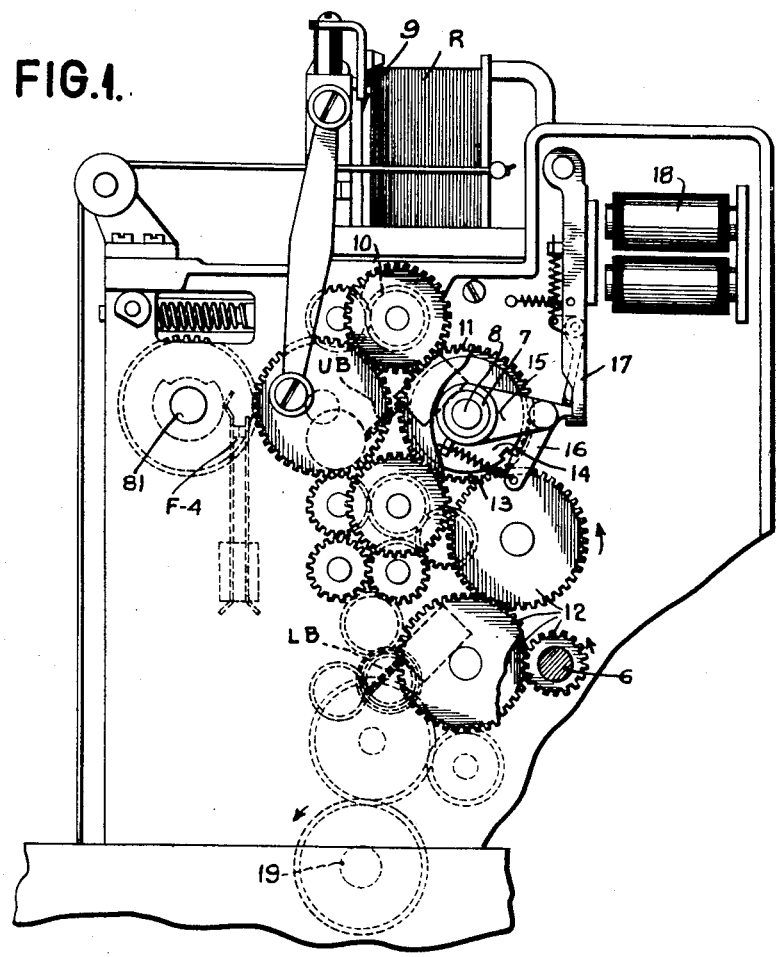
Fig. 1 is a side elevation view of the card feeding and analyzing mechanism showing the card feed declutching devices.

Figs. 24a, 24b, 24c and 24d together form a wiring diagram of the electrical controls of the machine.

The balance code printing devices, photoelectric balance reading devices and the adding controls of the present invention are coordinated with a ledger sheet posting control mechanism of the form revealed in Patent 2,297,743, filed August 22, 1936, by Fred M. Carroll et al. All devices are incorporated in a tabulating machine of the kind disclosed in Patent No. 2,126,621. The machine is designed to sense the data representations on perforated record cards, print a record and add the numeral data thereof. The cards are arranged in groups according to group numbers perforated therein, and the machine may be set for listing to print a record of the data on each card of a group, or for tabulating control so that there is printed only a record of the total amounts of the groups. Each group number usually corresponds with, or relates to, some ledger number which identifies an account. The tabulating machine exercises control over operation of the ledger posting sheet feeding devices through the group control devices. While operating in listing, it is desirable to eject the ledger sheet when the end of a related group of records is reached. Then, too, it is well to know which account is represented by the next group of cards to be sensed, so that the proper ledger sheet may be inserted in the machine. Both of these controls are exercised over the posting devices by devices in the tabulating machine which initate the ejection of a ledger sheet and set up numeral bearing wheels to indicate the group number of the cards about to be sensed. When the tabulator is operating under tabulating control, the ledger sheet ejecting means is operated after total printing on each group change.

The ledger posting devices in turn, exercise control over operation of the tabulator. The starting of card feeding operation is automatically delayed until the platen is lowered into the print receiving position, following cessation of high speed sheet feeding and line spacing, and after the balance, which is recorded in code on the ledger sheet, has been read and entered into the balance receiving accumulator. After a control break, the group control devices are reenergized under control of contacts closed as the platen is raised for the insertion of a ledger sheet. Other novel controls and interlocks between the regular machine structures, the balance entry devices and the ledger posting devices are described hereinafter.

Before describing the structure and operation of the balance entry devices with reference to the manner in which the code representations are printed, analyzed and added, it is believed well to describe in a general way the cooperating portions of the tabulator and the ledger posting devices so that the coordination of the balance entry devices therewith may be more readily understood.

The tabulating machine of Patent 2,126,621 to which the features of the present invention are applied is similar in most respects to the machine shown in Patent No. 1,976,617, issued October 9, 1934. This latter patent illustrates and explains in more extensive detail the manner of organization and mode of operation of the various units of a well known type of tabulating machine. In the present machine the reset motor RM of the Lake and Daly machine is omitted and the resetting mechanism is driven from the main driving motor, known as the tabulating motor, to thus constitute a single motor machine. In the present application, these mechanisms will be explained in only as much detail as will be necessary to explain the manner in which the objects of the invention may be realized.

*Card feeding mechanism*

The card feeding mechanism shown in Fig. 1 is similar to the usual feed devices except that provision is made in the form of a clutching device for interrupting the card feeding operations without stopping the accumulating drive mechanism. The card analyzing brushes are indicated at UB and LB and the record cards R are successively advanced by picker 9 to pairs of feed rollers 10, which serve to advance the cards past the upper and lower brushes in succession. The shafts upon which rollers 10 are mounted are provided with gears at their extremities and arranged as shown for operation by a main driving gear 11 which is freely mounted upon a shaft 6 and which has connection with an arm 15 through a sleeve 7. Arm 15 carries spring-pressed clutching dog 16 normally held in the position shown by an armature latch 17 which is controlled by the clutch magnet 18. Between gear 11 and arm 15 are a gear 13 and a clutch driving disk 14 freely rotatable upon the sleeve 7. Gear 13 has gear train connections generally designated 12 with the pulley shaft 6 which is in operation as long as the main driving motor is operative. Energization of magnet 18 will trip dog 16 into engagement with disk 14 and the card feeding mechanism will cause cards to be advanced past the brushes UB and LB and feeding operations will continue as long as magnet 18 remains energized. During balance entry and total taking cycles of operation, magnet 18 is deenergized and card feeding will not take place during such cycles.

Printing mechanism

Figure 1A:
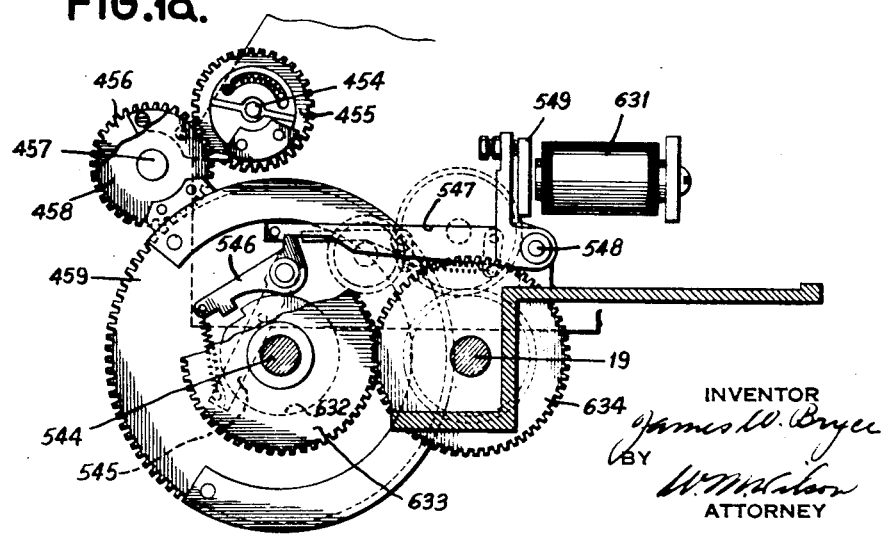
Fig. 1a is a detailed view of the controlling devices of the accumulator resetting mechanism.
Figure 1B:
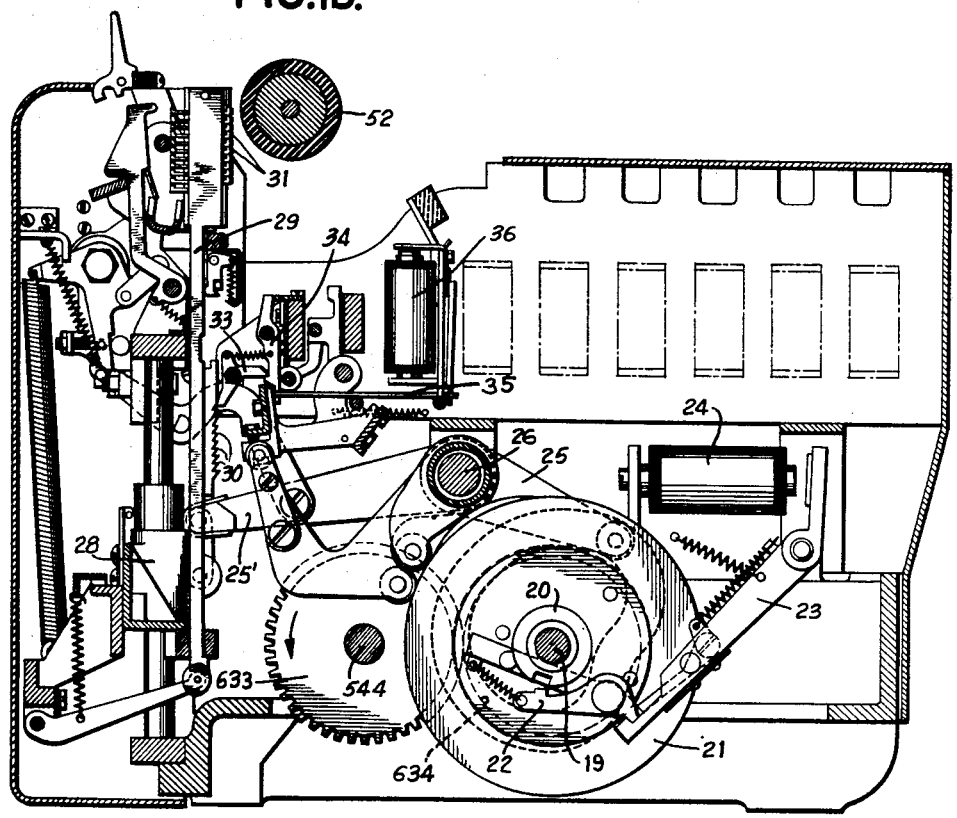
Fig. 1b is a central section of the essential elements of the printing mechanism.

The numeral printing mechanism is shown in Fig. 1b where the usual so-called listing shaft 19 carries a clutch driving element 20. Shaft 19 has direct driving connection with the constantly running shaft 6 (Fig. 1) so that clutch driving element 20 may rotate continuously. The listing cam 21 is freely carried on the shaft 19 and provided with a spring-pressed clutching dog 22 adapted for engagement with the driving element 20. Dog 22 is normally held out of engagement by arm 23 controlled by magnet 24. Energization of magnet 24 will permit cam 21 to rotate with the listing shaft 19, and follower arm 25 will cause oscillation of rocker shaft 26 to which are secured arms 25' link-connected to the reciprocating crosshead 28 so that for each revolution of cam 21, crosshead 28 will be moved upwardly and then down again to its initial position. Slidingly mounted in the crosshead are numeral typebars 29 spring urged into movement with the crosshead as it rises. As typebar 29 moves upwardly, ratchet teeth 30 successively pass the nose of a stopping pawl 33 as the digit type elements 31 successively pass the printing position opposite platen 52. Energization of printing control magnet 36 as the typebar moves upwardly, will draw call wire 35 toward the right to rock latch 34 out of engagement with stopping pawl 33 whereby the nose of the latter will engage one of the teeth 30 and interrupt further upward movement of the typebar. The upward movement of the typebar is synchronized with the movement of the record card past the analyzing brushes, and a perforation sensed by the brushes will energize the magnet 36 to interrupt the typebar with the type element 31 corresponding to the value of the digit represented by the analyzed perforation in printing position. Before the crosshead 28 moves downwardly, the usual printing hammers are tripped to take an impression from the selected type elements.

Cam 21 controls the movement of the crosshead 28 during both listing and total taking operations. The provision of magnet 24 and associated clutching devices together with the controlling circuits, which will be described in connection with the circuit diagram, permit the use of cam 21 for all printing purposes.

Accumulating mechanism

Figure 17:
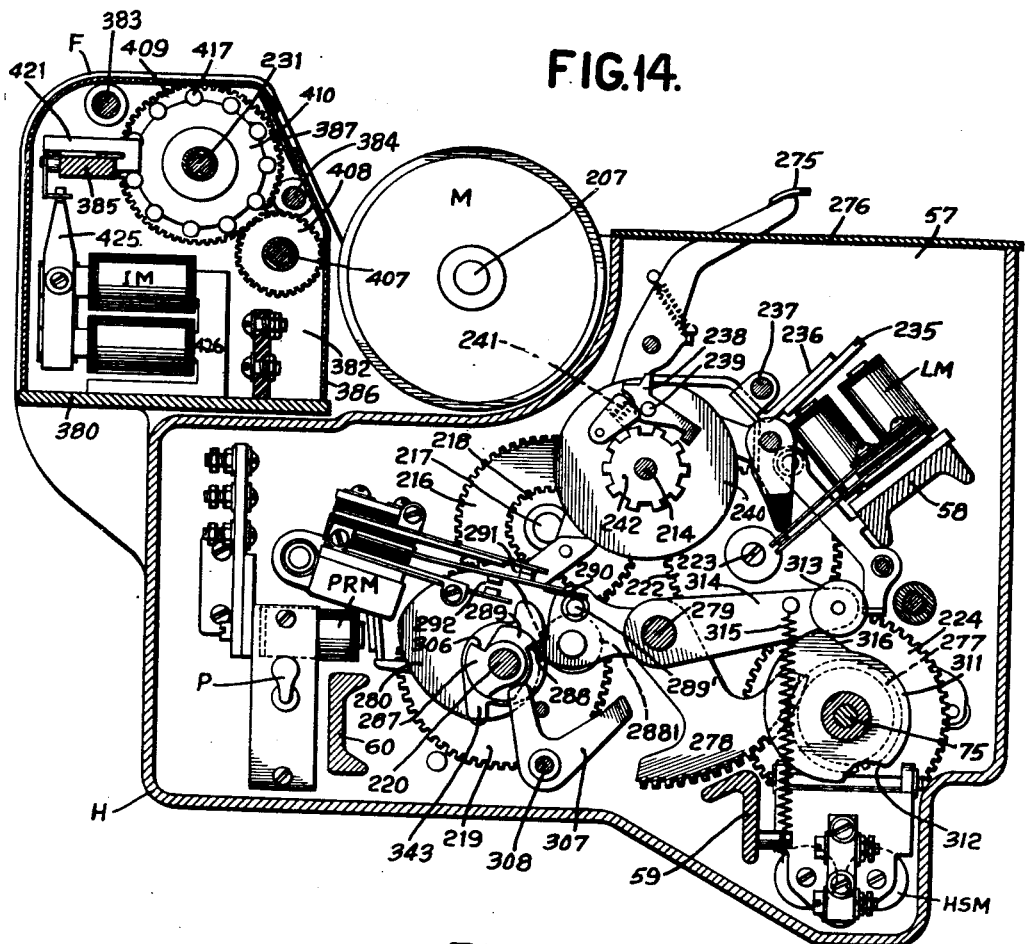
Fig. 17 is a perspective view of a representative portion of the adding and subtracting mechanism of the accumulator.

The machine is provided with one or more accumulators for adding and subtracting the entered data values to secure the amount of positive or negative balances. In Fig. 17 is shown a perspective view disclosing a representative order of an accumulator with its number entering controls. A drive shaft 1 is directly geared to pulley shaft 6 of Fig. 1 so that it is in operation as long as the driving motor of the machine functions and the driving ratio is such that shaft 1 makes one revolution for each card feeding cycle of the machine. Shaft 1 has slidably mounted thereon, but keyed for rotation therewith, a clutch element 2, one for each denominational order of the accumulator. The element 2 is provided with a groove into which fits the end of the short arm of a lever 3 which is pivoted as shown and provided with a block 4 normally abutting an armature latch 5 of adding magnet 44. A leaf spring 45 bears against the extremity of the longer arm of lever 3 and moves the same in a counterclockwise direction upon release of block 4 by armature 5. This movement will bring clutching member 2 into engagement with cooperating teeth 39 integral with a gear 40 loosely mounted on shaft 1. Gear 40, when thus coupled to shaft 1, will rotate a gear 46 which meshes therewith and will displace the accumulator index wheel 47.

The rearward extremity of lever 3 is adapted to be engaged by a finger 48 toward the end of the cycle for the purpose of disengaging clutch element 2 from teeth 39 and re-latching block 4 on armature 5.

Figure 9:
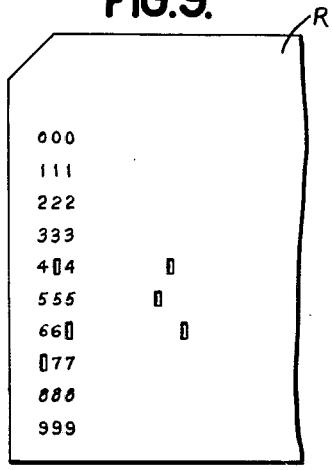
Fig. 9 shows a portion of a perforated record card.

Briefly summarizing the adding operation, the magnet 44 may be energized at various points in the cycle of the machine, depending upon the location of a perforation in a column of the record card R, Fig. 9, analyzed by the lower brushes LB. This energization may take place in response to a perforation in any of the index point positions from 9 to 1, inclusive. A perforation in the 9 index point position will trip the clutch element 2 nine steps before finger 48 is operated to de-clutch it; and a perforation in the 1 index point position will trip the clutch element 2 one step before it is declutched by the finger 48. Each step of clutching engagement corresponds to a tenth of a revolution of the accumulator index wheel 47 so that a "9" hole will move it nine-tenths of a revolution and a "1" hole will move it one-tenth of a revolution. The manner in which circuits through the lower brushes control the operation of magnet 44 will be set forth in connection with the explanation of the circuit diagram.

Carry mechanism

Figure 18:
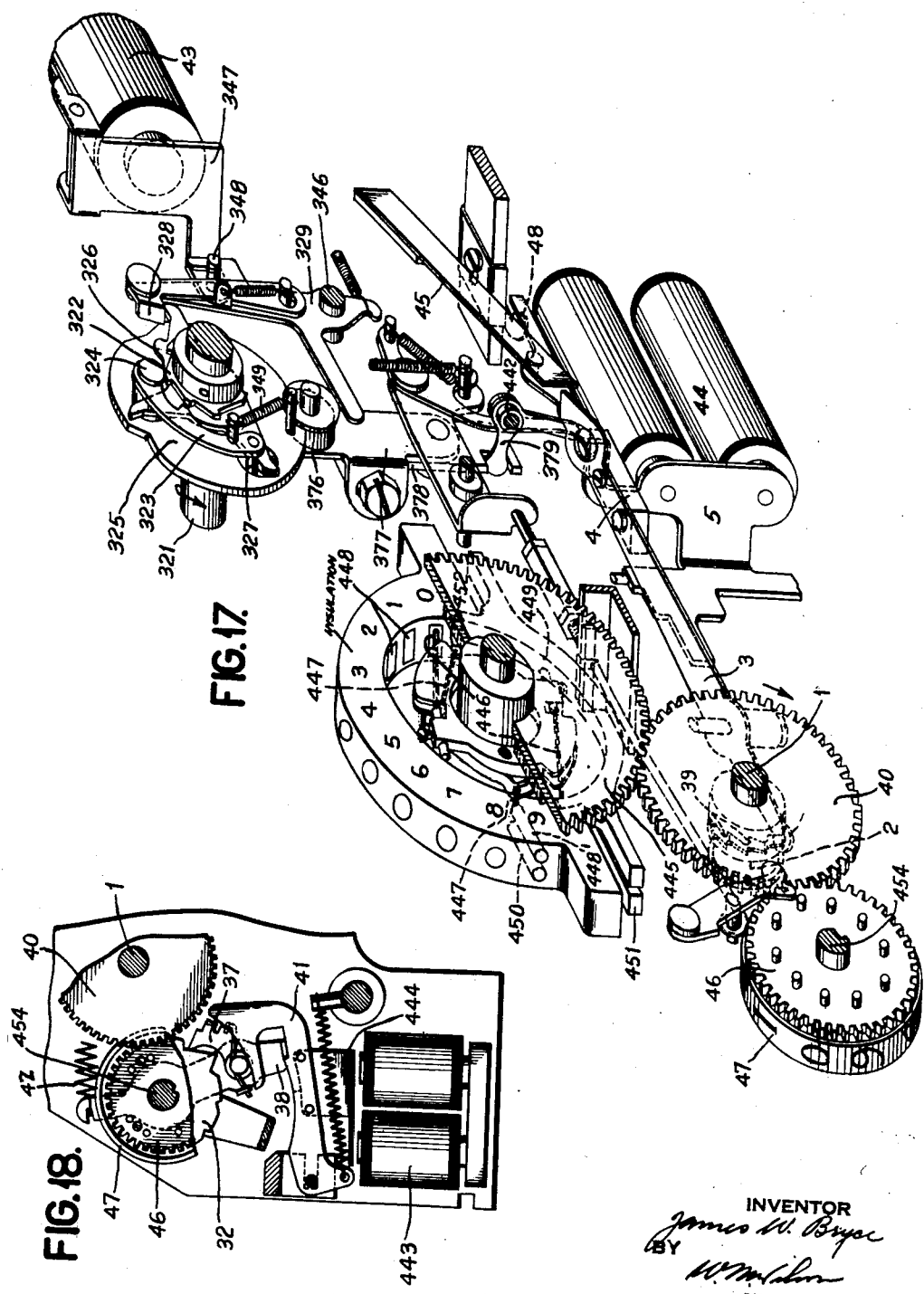
Fig. 18 is an elevation view of the elusive unit entry device of the accumulator.

Each wheel 47 has associated therewith a carry cam 32, Fig. 18, which cooperates with a pawl 37 pivoted on a latch arm 38. When the wheel 47 passes through the zero position, a high tooth of the carry cam 32 will engage and rock down its pawl 37 which, through an extension thereon, presses down a latch 41 normally holding the arm 38 of the next higher order. When released, arm 38 is moved by spring 42 to operate pawl 37 and engage a tooth on cam 32 to turn the wheel one step.

Subtracting mechanism

In the operation of the subtracting accumulator, the entry of the nine complement of a number to be subtracted is effected by initially tripping all the adding magnets 44 as though to add nines in each position and causing the perforation in the record card to de-clutch the adding mechanism in accordance with the location of the perforation. This will result in the addition of the nine complement of the number. The elusive one is added into the units order of the accumulator independently to thereby change the nine complement to a ten complement. For example, if an 8 is to be subtracted in a particular order, the related adding magnet 44 is tripped at the 9 position in the cycle of the machine and the index wheel will commence to rotate. At the next index point position, which is 8, the perforation will, through the mechanism to be presently described, cause de-clutching of the mechanism after the index wheel 47 has turned through one step with the result that a one is added into the index wheel, representative of the nine complement of 8. The mechanism for effecting this de-clutching action will now be described. A shaft 321 is geared to the constantly rotating connections of the machine, the ratio being such that shaft 321 makes two revolutions for one revolution of shaft 1. Secured to shaft 321 is a clutch element 322, and cooperating with the element is a clutching dog 323 pivoted at 324 to a cam 325 freely mounted on shaft 321. Also freely mounted on the shaft is a triple-armed member 326, one of whose arms engages a pin 327 in the free end of dog 323 to hold the latter out of engagement with the driving element 322. Each of the arms of member 326 is adapted to cooperate in turn with a pawl 328 which is carried by clutch element 329 which is pivoted at 346. The pawl 328 is resiliently mounted on element 329 through spring and pin connection. A magnet armature 347 having a pin 348 in a laterally extending arm thereof, is adapted, upon energization of a subtracting magnet 43, to rock element 329 in a clockwise direction to release member 326 thereby permitting spring 349 to rock the member in a counterclockwise direction and at the same time permit the engagement of dog 323 with the driving element 322. The cam 325 will thus be driven in a counterclockwise direction until the next arm of member 326 is engaged by pawl 328, which then causes disengagement of the clutch and interruption of further movement of the cam. The cam 325 is provided with three notches about its periphery, into which a roller 376 rises successively.

Upon the initial movement of cam 325, the higher, concentric portion of the cam will depress roller 376 and with it slider 377 upon which the roller is pivoted. Slider 377 has adjustably connected thereto another slider 378 which is vertically positionable with respect to the first slider by a pin and slot connection. The lower extremity of slider 378 is provided with a notch into which the horizontal arm of a bell crank 379 is fitted. The bell crank is pivoted at 442 and its depending arm lies adjacent to an edge of the clutch arm 3 so that the downward movement of slider 378 will cause the bell crank 379 to engage and move arm 3 in a de-clutching direction at a time determined by the time of energization of magnet 43 which is in turn controlled by a circuit extending through a lower brush to the perforation in the card. Thus the adding wheel is declutched from the drive connections after the complement value has been entered therein.

*Elusive unit entry devices*

The mechanism by means of which the elusive one is entered into an accumulator is illustrated in Fig. 18. The units order of each subtracting accumulator has associated therewith a magnet 443 whose armature 444 is secured to the carry lever latch 41 of the units order so that energization of the magnet will trip the units pawl carrying arm 38, whereby, during the carrying portion of the machine cycle, the pawl 37 associated with the units order will advance the units wheel one step.

*Balance read-out devices*

After various item amounts have been added and subtracted in the accumulator, it is desirable to bring into control between the accumulator and the printing devices some reading devices which make it possible to print a record of the positive or negative balance registered in the accumulator. These reading devices are in the form of electrical brush and commutator structures, one of which is shown associated with the accumulator order in Fig. 17. Each reading device is driven by a gear 445 meshing with accumulator gear 40 which is between it and the indicator gear 46. Since the ratio of the gears 445 and 46 is 2:1, the former will turn through a half revolution for each revolution of the latter.

Each gear 445 carries two pairs of electrically connected brushes 446 and 447 insulated therefrom. For purposes of illustration these two brush sets are shown in Fig. 17 as fastened to one side of gear 445, but actually they appear as in Patent 2,007,375 where a detailed showing is presented. The secondary pair of mounted brushes 447 are set back 18 degrees or a twentieth of a revolution with respect to brushes 446.

The angular displacement of gear 40 and wheel 47 upon entry of a number, is accompanied by a corresponding angular displacement of gear 445 and brushes 446 and 447. Thus if a "6" is entered into an order, the brushes 446 and 447 will be rotated six steps or six twentieths of a revolution in a counterclockwise direction as viewed in Fig. 17.

Cooperating with brushes 446 is a commutator device comprising contact segments 448 and a common arcuate conductor 449 between which brushes 446 form an electrical connection. There are ten segments 448 numbered 0, 1, 2, 3 ... 9 and one of the brushes 446 will contact with the segment 448 representing the setting of the accumulator wheel while the other brush contacts with conductor 449. Thus in Fig. 17, brushes 446 are positioned in accordance with the positioning of the accumulator wheel at zero.

The brushes 447 cooperate in a similar way with the segments 448 and form electrical connection between the segments and another common conductor 451. It will be noted in Fig. 17 that this connection is made only between segments 0–8 and conductor 451. A special segment 452 is provided with which one of the brushes 17 contacts when the other brush contacts the special "9" segment 450. The reasons for this arrangement will be made apparent hereinafter in the description of the circuit diagram. It was stated hereinbefore that brushes 447 are angularly displaced one step behind brushes 446 so that with brushes 446 set at "0" as in Fig. 17, brushes 447 will take a position bridging "9" segment 450 and the special segment 452. Connecting bars or strips 453 are provided to connect electrically all the like numbered segments 448 together, except in the "9" position where only the segments 448' are connected together.

The highest order position of the device is provided with a single segment 450' in the "9" position which is connected by brushes 447 in this order to a common conductor 451' whose configuration is the same as that of conductors 451.

*Accumulator resetting mechanism*

The shaft 454 (Fig. 17) upon which the index wheels 47 of an accumulator are loosely mounted, is notched for cooperation with spring-pressed pawls pivoted upon and carried by the individual index wheels in such manner that counterclockwise rotation of shaft 454 will engage and drive the index wheels 47 forwardly to zero position during a single revolution of the shaft.

Referring to Fig. 1a, shaft 454 carries a gear 455 at its extremity which is in engagement with gear 456 mounted upon reset shaft 457. Gear 456, of which there is one for each accumulator, may be selectively coupled to the resetting shaft 457 in the well known manner. At the extremity of shaft 457 is a gear 458 which is adapted to be driven by an intermittent gear 459 which is secured to shaft 544. Also fixed to shaft 544 is an arm 545 which carries a spring-pressed clutch dog 546 normally held in the position shown in Fig. 1a by a latching arm 547 supported by armature shaft 548 of magnet armature 549. Energization of magnet 631 will release dog 546 for engagement with a clutch driving element 632. Element 632 is integral with a gear 633 which meshes with a gear 634 secured upon constantly running shaft 19. With this arrangement, drive element 632 is in constant rotation and whenever it is desired to effect resetting of the accumulator, magnet 631 is energized to establish a connection between the element 632 are the resetting shaft 457. Resetting is usually an accompaniment of total taking and, by virtue of the intermittent gear connection, occurs during the latter part of the total taking cycle. With the present arrangement, total taking is brought about simply by energizing the magnet 24, Fig. 1b, to cause operation of the printing devices in the same manner as for listing, and by energizing the reset clutch magnet 631 so that resetting may follow the printing of the totals from the accumulators.

The ledger sheet feeding devices

Since the balance entry devices of the present invention are coordinated with the sheet feeding devices which are adapted to automatically reinsert the ledger sheet to a differential position to receive balance representing impressions and later automatically eject the sheet, it is believed well to describe these sheet handling devices of Patent 2,297,743.

The main purpose of the posting device is to move a ledger sheet 50 (Fig. 10) to the correct printing position as rapidly as possible. If the ledger sheet already contains five lines of print, when it is reinserted it is to be fed to the sixth line. A perforation 51 is punched in the right margin of the sheet for each line of print and it is through such perforations that photoelectric control of sheet feeding and positioning is established. In Fig. 2 it is seen that most of the sheet feeding mechanism is to the left side of the platen 52. A platen driving motor M, an indicating unit F, and housing H containing the high speed, line space, and platen lifting mechanisms are all on the left side.

The framework of the platen operating devices

Figure 12:
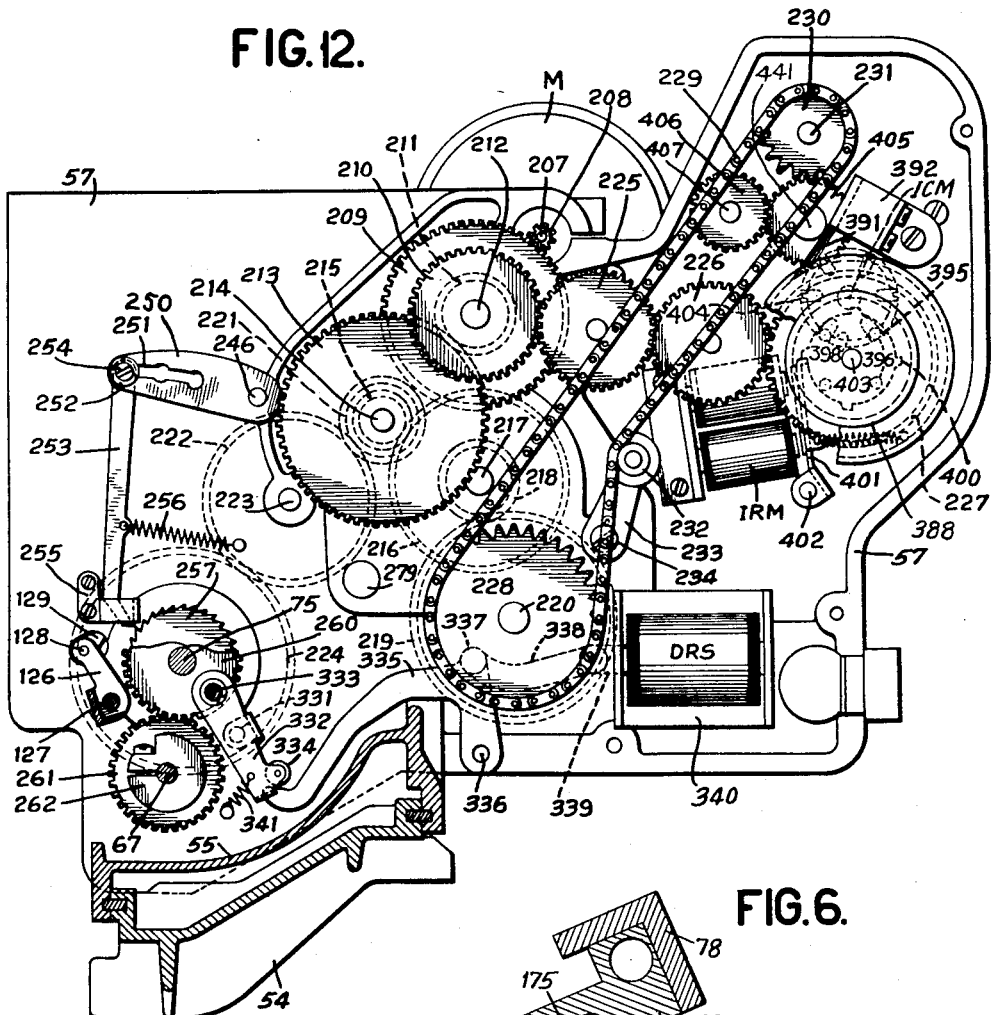
Fig. 12 is a right elevation view of the driving mechanism partly in section taken along the line 12—12 in Fig. 11.

A lower carriage frame 54 (Fig 12) is fixed in the tabulating machine and a carriage slide 55 is movable thereon, although for most printing operations the carriage is held in one position, and the ledger posting mechanism is mounted on side frames fixed to the carriage slide 55 so that the mechanism is movable sideways with the platen into any tabular position. At the right side of slide 55, there is fixed to the slide a vertical side plate 56 (Figs. 2 and 3) and to the left side, there is fastened a large cast iron side frame 57 (Figs. 11 and 12). Extending from the large frame 57 are three long bosses 58, 59, and 60 (Fig. 13) to which is attached a vertical bearing plate 61 (Fig. 11) under housing H.

A rearwardly extending plate 63 (Figs. 2 and 3) is provided to form a fastening point for the right side of the paper table. The plate 63 is fastened at its front end by screws in an extension 64 on carriage slide 55. Another extension plate 66 (Fig. 2) is fastened to the cover under the left edge of the paper table in line with plate 63 at the right.

The platen suspending and lifting devices

Figure 5:
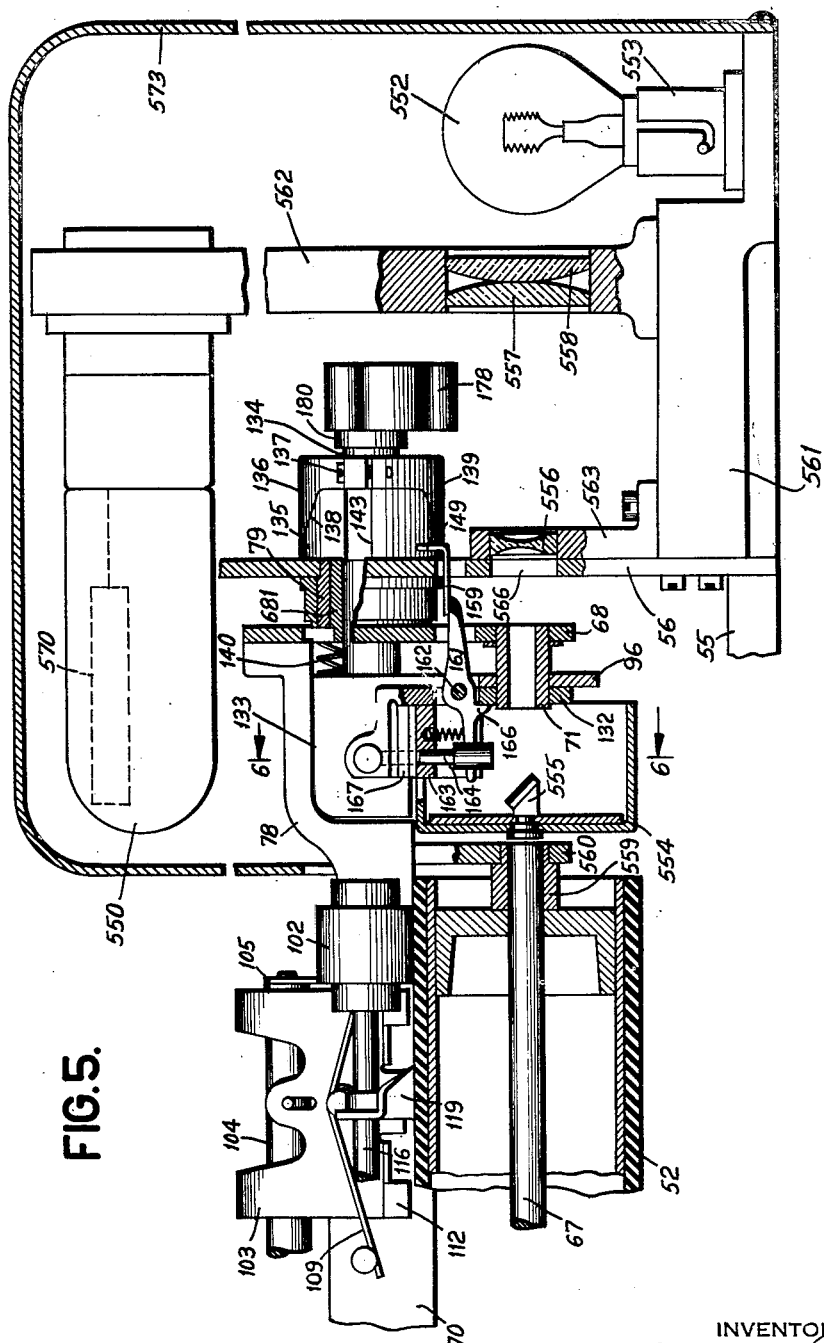
Fig. 5 is a front sectional view cut through the platen and the sliding frame containing the sensing light deflecting mirror and the punch.

The platen 52 is fixed to a shaft 67 (Fig. 5) which is loosely pivoted and suspended on a pair of arms 560 and 69 (Fig. 2) attached to a rectangular pivot bar 70. In Fig. 5, it is seen that the right end of platen shaft 67 is free to turn in a bushing 559 attached to arm 568. The left end of the platen shaft is loosely pivoted in a bushing 74 (Fig. 11) fastened to arm 69.

The left end of the pivot bar 70 (Fig. 15) is formed as a trunnion 75 which pivots in a bearing 76 on the bearing plate 61. This end of the bar is also supported indirectly by the ball bearing 77 in frame 57. The right end of bar 70 is attached to a bracket 78 (Fig. 5) fastened to the arm 68 from which there extends a hollow journal 681 which is pivoted loosely in a bearing 79 fixed on the side frame 56. Thus, in effect, the bar pivots in the right side frame in the bearing 79.

When the bar 70 is turned in a counterclockwise direction, the platen 52 is lifted from the lower print receiving position (Figs. 4 and 16) and swung through an arc of about 180° to the upper sheet receiving position (Fig. 3) and it is explained hereinafter how the bar 70 is rocked to lift and lower the platen.

The paper guides

A large paper table 82 (Figs. 2 and 3) is mounted a distance beyond the platen and tilted slightly downward to direct the front end toward the platen. The sides 83 and 84 of the table are turned up to confine and guide the ledger sheets placed on the table. A pair of fastening brackets 85 extend down from the bottom of the table 82 to engage studs 86 and 87 on plate 63.

A small table 90 is arranged as a flexible forward extension of the large table 82 and it is secured thereto by a hinge 91. A pair of slotted links 94 loosely engaging the sides of the small table, permit it to rock up and down with the platen to a limited extent. The platen frame carries a paper guide which is movable therewith so that it is at the correct angle for guiding the insertion of paper whether the platen is in the lowered or raised position. A pair of arms 95 and 96 (Fig. 2) loosely pivoted on the platen shaft 67, carry the paper guide 97 which extends across the entire width of the platen. The rear ends of the arms are pivoted at 98 to links 99 (Fig. 3) pivoted on studs 100 protruding from the frames.

A V-shaped paper guide 101 (Fig. 16) extends across the carriage behind the platen and is fastened to the inside of arms 95 and 96.

When inserting the ledger sheet 50 for printing, it is placed upside down on table 82 (Fig. 2) with the top edge forward towards the platen; then the right side of the sheet is brought into contact with the side 84 and shifted forward under platen feed rollers and against paper stops. This places the perforated right margin of the sheet in a correct position with respect to the marginal sensing and punching devices.

The paper stops

A series of stops 103 (Figs. 2 and 16) are brought against the platen to form a fixed limiting point for the forward edge of the sheet when it is inserted between feed rollers 102 and the platen when the platen is in the upper position.

These stops are retracted when the platen is lowered. From the end of each stop, there branches out two U-shaped arms which engage a shaft 104 pivotally mounted at the right end on a bracket 105 (Fig. 5) attached to bar 70 and pivoted at the left end in an extension 106 (Fig. 3a) of arm 69. The arms of the stop permit it to slide vertically on shaft 104 toward and away from the platen. When the platen is in the lowered position, the shaft 104 and the pins 107 thereon are held at such an angle (Fig. 16) that the stops 103 are lifted with the feet 112 away from the platen so that the ledger sheet 50 may pass freely. The shaft 104 is held in that position by an operating arm 113 (Fig. 11) secured thereto by screws 114. The end of arm 113 normally cooperates with the concentric edge of platen arm 95 (Figs. 16) and thus holds the stops up, but when the platen and arm 95 are swung up, the end of arm 113 drops into a notch 115 in the lower part of arm 95, rocking shaft 104 in a counterclockwise direction and permitting stops 103 to move against the platen.

The feed rollers

Figure 7:
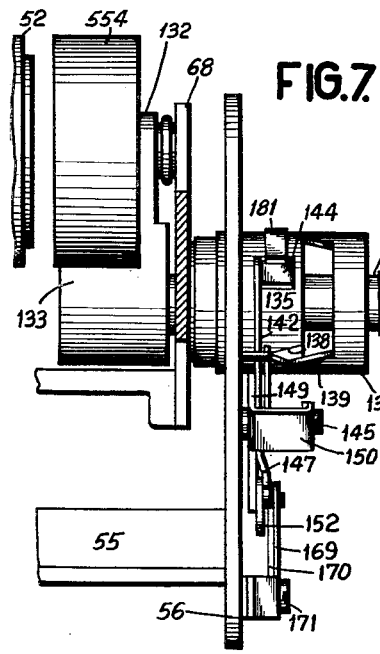
Fig. 7 is a front elevation view of the punch frame shown with the platen in a raised position.
Figure 16:
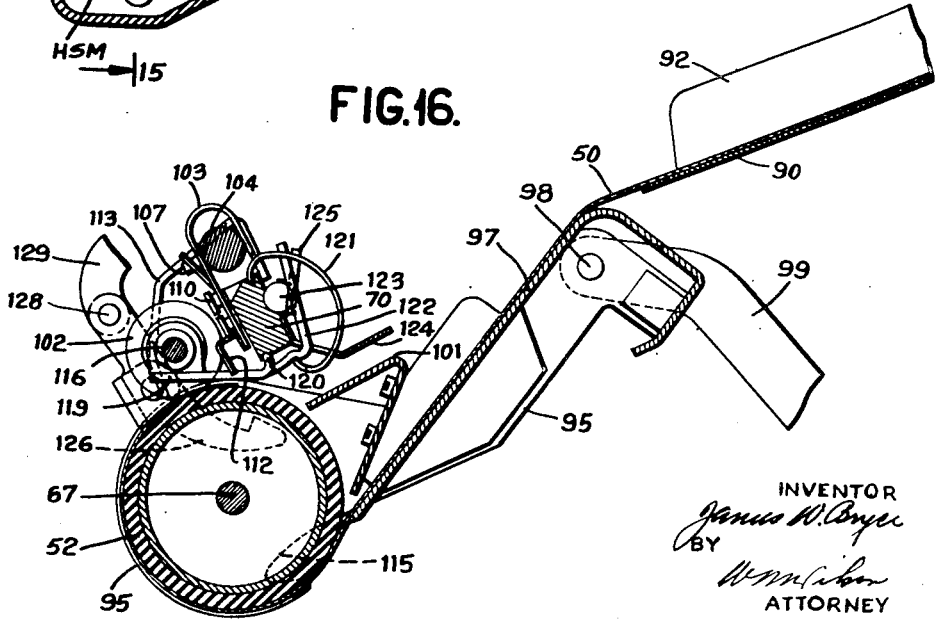
Fig. 16 is a sectional view of the platen with the associated pressure feed rollers and paper stops in the positions they assume when the platen is in the lower position.

A number of feed rollers 102 are pressed into contact with the platen 52 and moved along therewith to wrap the ledger sheet 50 around the platen as it is lowered from the position shown in Figs. 3 and 7 to the position of Fig. 16. These rollers 102 are fixed on a shaft 116 (Fig. 2) which is geared to the platen by a pinion 117 in mesh with a gear 118 fastened to the platen. Shaft 116 is suspended near the platen by passing through hubs on a series of crank levers 119 pivoted at 120 (Fig. 16) in a notch cut along the length of bar 70. A pointed tab extending from lever 119 fits in the notch and acts as a fulcrum about which the lever rocks. A curved leaf spring 121 is sprung between a notch in bar 70 and a depression in lever 119 and there acts to urge rollers 102 into contact with the platen.

A tail 122 extending from each of the crank levers 119 presses against the flat side of a rod 123 which rests in a semicircular groove along the side of bar 70. A paper tearing blade 124 secured to bar 70 is formed with a curved portion wrapped around the outside of rod 123 to hold it on the bar.

Fastened to rod 123 is an extension tab 125 which may be operated to turn the rod so that tails 122 are cammed from the flat part to the periphery of the rod. When this is done, the front ends of the levers 119 are raised to carry the shaft 116 and the rollers 102 thereon away from the platen. As the platen and the associated parts are swung up, near the end of the upswing a latch 126 engages the end of extension 125 to hold it as the other parts continue to move with the result that rod 123 is rocked slightly in a clockwise direction and rollers 102 are separated from the platen so that a ledger sheet 50 may pass between them and against stop feet 112. The rollers 102 are held in the separated position until the down swing movement of the platen is initiated, and then, even before the platen starts to move, the latch 126 is tripped to release extension 125 permitting rod 123 to assume normal position under the pressure of tails 122 and springs 121 and freeing levers 119 to press rollers 102 against the sheet 50 to hold it on the platen as it is rocked and lowered. Latch 126 is formed as a bail (Fig. 11) pivoted on a stud 127 on frame 57 (Fig. 12) and provided with a stud 128 to which is articulated an operating link 129 which functions in a manner fully explained hereinafter.

The ledger sheet punching and sensing devices

The devices for punching and sensing the marginal perforations 51 (Fig. 10) in the ledger sheet 50 are located near the right end of the platen and held in a housing 554 attached to a flange 132 on a casting 133 formed with a long tube 134 projecting through arm 68 and side plate 56. Since the punch and sensing means are mounted in the same framework, the frame is made shiftable so that either one may be brought into alignment with the marginal perforations of the sheet. The entire unit is slidable along hub 71 mounted in the support 68 and movable in the tube 681 on arm 68.

Figure 8:
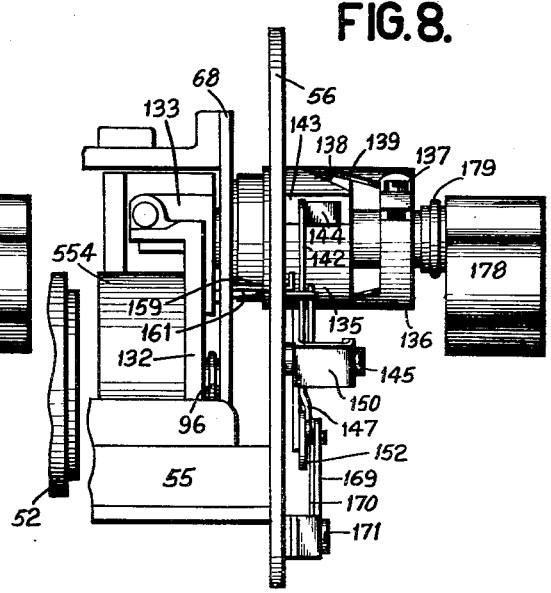
Fig. 8 is a front elevation view of the punch frame with the platen shown in a lowered position.

A pair of cam sleeves 135 and 136 (Fig. 5) are used to cam the punch and sensing unit frame over to the right (Figs. 7 and 8) so that a mirror 555 is in a position to reflect light beams through the marginal perforations. The sleeve 136 (Fig. 5) is slotted and a screw 137 tightens it to hold it fast to the tube 134. Sleeve 135 is loose on tube 134 but confined laterally between side plate 56 and sleeve 136. This loose sleeve 136 is formed with two V-notches 138 cooperating with two pointed cam points 139 on sleeve 136. Projecting from a cylindrical recess in casting 133 is a spring 140 pressed between arms 68 and casting 133, thus tending to hold the points 139 of sleeve 136 in notches 138, or bearing against the side of the notches when the sleeves are moved relative to each other.

When the platen is lowered after a new ledger sheet is wrapped thereon, it is desired that the light reflecting mirror 555 be placed in a position to reflect light through the perforations in the sheet and control the feeding thereof to the correct printing position. The sensing unit therefore is prevented from slipping over to the left and is cammed over to the right by means of a latch 142 (Figs. 3 and 8) which engages a notch 143 in sleeve 135 to hold sleeve 135 as sleeve 136 is rocked with the unit towards the end of lowering swing of the platen. With sleeve 135 held and sleeve 136 still turning at that time, cam points 139 ride up the side of V notches 138 a distance sufficient to shift the unit so that the sensing means takes the position formerly occupied by the punch. The pressure of points 139 against the side walls of the V notches 138 tends to turn sleeve 135 but the lower edge of notch 143 is engaged by the lug 144 on latch 142.

After the sheet is properly positioned and the sensing operations are completed, card feeding is started and the sensing and punch unit frame 133 is released to move to the left so that the punch is in position to operate on the sheet along with the printing mechanism. The movement is initiated by tripping latch 142 so that sleeve 135 may turn to a position wherein points 139 are depressed fully into notches 138; then the sleeve 136 and the unit connected therewith are moved to the left by spring 140. Latch 142 (Fig. 3) is pivoted on a stud 145 on side plate 56 and is formed with an operating extension 147. A spring 148 wound around stud 145 presses against latch 142 and urges it into cooperation with sleeve 135. Also mounted on stud 145 is a punch operating lever 149 formed with an offset bail portion. A stud 151 connecting the end of lever 149 to an operating link 152 is long enough to cooperate with extension 147 on latch 142. The other end of link 152 is articulated at 153 (Fig.

4) to a lever 154 pivoted on a stud 155 on frame 63. Also mounted on frame 63 are a pair of solenoids PS and SS with plungers 156 and 157 pivoted to lever 154 at 158 and 153. When the shift solenoid SS is energized, the plunger 157 is drawn to the right and the link 152 is drawn along therewith so that stud 151 operates latch 142 in a clockwise direction to release sleeve 135 so that the unit may move to the left into the position shown in Fig. 5. This occurs early in the printing cycle so that later, when the punch is operated, it is in the correct position with respect to the margin of the ledger sheet.

The other solenoid PS (Fig. 4) attracts the plunger 156 and rocks the lever 154 in a clockwise direction to push the link 152. When so moved, the link turns the punch operating lever 149 in a clockwise direction to depress a tab 159 on the lever which extends through an opening in frame 56. In Fig. 5, it is seen that tab 159 overlies one end of a punch lever 161 pivoted at 162 in a metallic insert 163 (Fig. 6) held in the cylinder 554 and secured to flange 132. The other end of lever 161 fits into a slot in the side of a punch 164 slidable in insert 163, a spring pressing against lever 161 holds the punch normally retracted with a stop 166 on the lever against the side of the flange 132 and the end of the lever contacting the underside of tab 159. A die plate 167 is secured to the underside of casting 133 with a die opening 168 aligned with punch 164. From the foregoing, it is clear that every time solenoid PS (Fig. 4) is energized, link 152 is pushed, lever 161 is rocked clockwise (Fig. 5), and punch 164 is lifted to perforate a hole in the margin of the ledger sheet.

Link 152 (Fig. 4) is restored in both directions by a pair of arms 169 and 170 pivoted on a screw stud 171 fixed to frame 56. A spring coiled around stud 171 and pressing against offset tabs on the arms, urges the arms together towards a centralized stop stud on frame 56.

Whenever the platen is lifted (Fig. 7) the sleeve 135 is prevented from turning as far as sleeve 136 with the result that projections 139 ride up the sides of notches 138 to displace the sliding punch unit to the right. Sleeve 135 is stopped by an extension 181 thereon engaging the top of lug 144 (Fig. 3). The reason that the punch unit is moved to the right when the platen is raised is that it is necessary to bring the light reflecting mirror 555 (Fig. 5) into the perforation sensing position.

*Photo cell sensing of feed control perforations*

Figure 6:
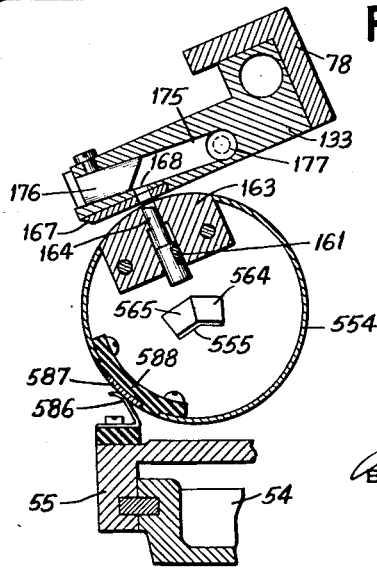
Fig. 6 is a view taken along the line 6—6 in Fig. 5 and shows the punch and the chip ejecting chamber.

Attached to side plate 56 (Fig. 5) is a bracket 561 carrying a socket 553 for a light bulb 552, a standard 562 for photo cells 550, 551 and lenses 557, 558, and a standard 563 for lens 556. Fixed to the shifting punch frame 133 is the cylindrical mirror holder 554 of the same diameter as platen 52. Riveted to the rear wall of the cylinder is the mirror 555 with two beveled reflecting surfaces 564 and 565 (Fig. 6).

The bushing 71 (Fig. 5) on swinging arm 68 is hollow and in line with an opening 566 in side plate 56 through which the light rays from bulb 552 may pass after going through lenses 556, 557 and 558. After the light rays pass through hole 556 and bushing 71, they are reflected upwardly by the mirror surfaces 564 and 565.

The light, diverted by surface 564, passes first through a hole 567 (Fig. 2) in the periphery of cylinder 554, then through a hole 51 in the ledger sheet, and finally impinges against the light sensitive element 570 in the line space control photo cell 550. The other portion of light which is reflected by surface 565 is directed to the left through a hole 571 in cylinder 554, a hole 51 in the ledger sheet and then thrown against the sensitive element 572 (Fig. 3) in the high speed control photo cell 551.

Holes 567 and 571 are aligned in cylinder 554 and positioned to coincide with the marginal perforations in the ledger sheet when the punch and mirror frame is moved to the right (Fig. 5) to place the punch plunger aside from the right edge of the sheet. When the frame 133 is shifted to the left so that the punch is in effective position, the imperforate part of the ledger sheet overlies the holes in the cylinder and thus cuts off the light rays.

Thus it is apparent that the two photo cells 550 and 551 sense the marginal perforations and influence the feeding mechanisms associated with the platen so that the ledger sheet 50 is fed to a posting position under the line of print impressed on the ledger sheet the last time the sheet was in the tubulator. The one light beam reflected onto photo cell 550 is used to control line spacing movement of the sheet. The beam of light reflected through the opening 571 to the photo cell 551 is used to control high speed feeding of the sheet so that the sheet is forwarded rapidly from the entering position to within a few line spaces short of the correct printing position after which line spacing impulses bring it into position. Mounted in the cylinder 554 (Fig. 6) is an insulated member 588. Embedded in the insulated member 588 is a metallic contact block 587 cooperating with a brush 586 which is used to sense the passage of the end of a ledger sheet and control ejection of the sheet and lifting of the platen into position to receive a new sheet.

*The platen driving mechanism*

At the left side of the machine is located a driving motor M (Fig. 12) which is geared to connections for line spacing the platen, high speed feeding the platen, lifting and lowering the platen, and operating the indicating wheels. The motor is attached to the main carriage frame 57 and its drive shaft 207 carries an operating pinion 208. In mesh with the pinion 208 is a gear 209 fastened to a pair of gears 210, 211 pivoted on a stud 212 on frame 57. A large gear 213 meshes with gear 211 and drives a line space operating shaft 214. Fastened to shaft 214 is a pinion 215 meshing with a large idler gear 216 pivoted on stud 217 and provided with a pinion 218 meshing with a gear 219 loosely mounted on the platen lifting drive shaft 220.

Another gear 221 is fastened to gear 213 for the purpose of driving the high speed platen operating mechanism. This gear meshes with an idler gear 222 pivoted at 223 and drives a gear 224 loosely pivoted on the trunnion 75 (Fig. 15) of the platen lifting bar 70.

Indicator setting wheels are driven by a train of gearing extending towards the rear of the machine. Gear 210 (Fig. 12) meshes with a gear 225 which in turn meshes with another idler 226. In engagement with gear 226 is a gear 227 forming part of the friction clutch connections leading to the indicator setting wheels.

In addition to the indicator setting wheels adjusted through the friction clutch, the indicator contains another set of numeral exhibiting wheels frictionally driven to positions corresponding to the setting of the first mentioned wheels. There is a direct connection from the platen lifting clutch shaft 220 to the operating shaft associated with the indicating wheels. This direct connection includes a sprocket wheel 228 attached to the end of platen lifting shaft 220 so that every time the platen is lifted, the group number of the next set of cards is indicated. Engaging the sprocket wheel is a chain 229 which is wrapped around another sprocket 230 fastened to an indicator operating shaft 231.

The line spacing devices

The machine is provided with devices for spacing the ledger sheet line by line between operations of the printing mechanism. The line spacing operation is initiated by a magnet LM, Fig. 14, which, when energized, attracts an armature 235 fastened to a lever 236 pivoted on a stud 237. The end of lever 236 cooperates with a clutch pawl 238 pivoted at 239 on a disk 240 loosely mounted on the shaft 214. A spring 241 tends to turn the pawl 238 in a clockwise direction to engage it with the teeth on a clutch driving wheel 242 fastened to shaft 214, but the armature lever 236 is normally positioned to hold the pawl out of engagement. However, when magnet LM is energized, lever 236 is rocked in a clockwise direction and pawl 238 is released so that it also rocks in the same direction to engage the teeth on wheel 242 and form a positive connection between shaft 214 and disk 240. The connection is maintained for one revolution, after which the end of lever 236 again holds the pawl ineffective.

Figure 13:
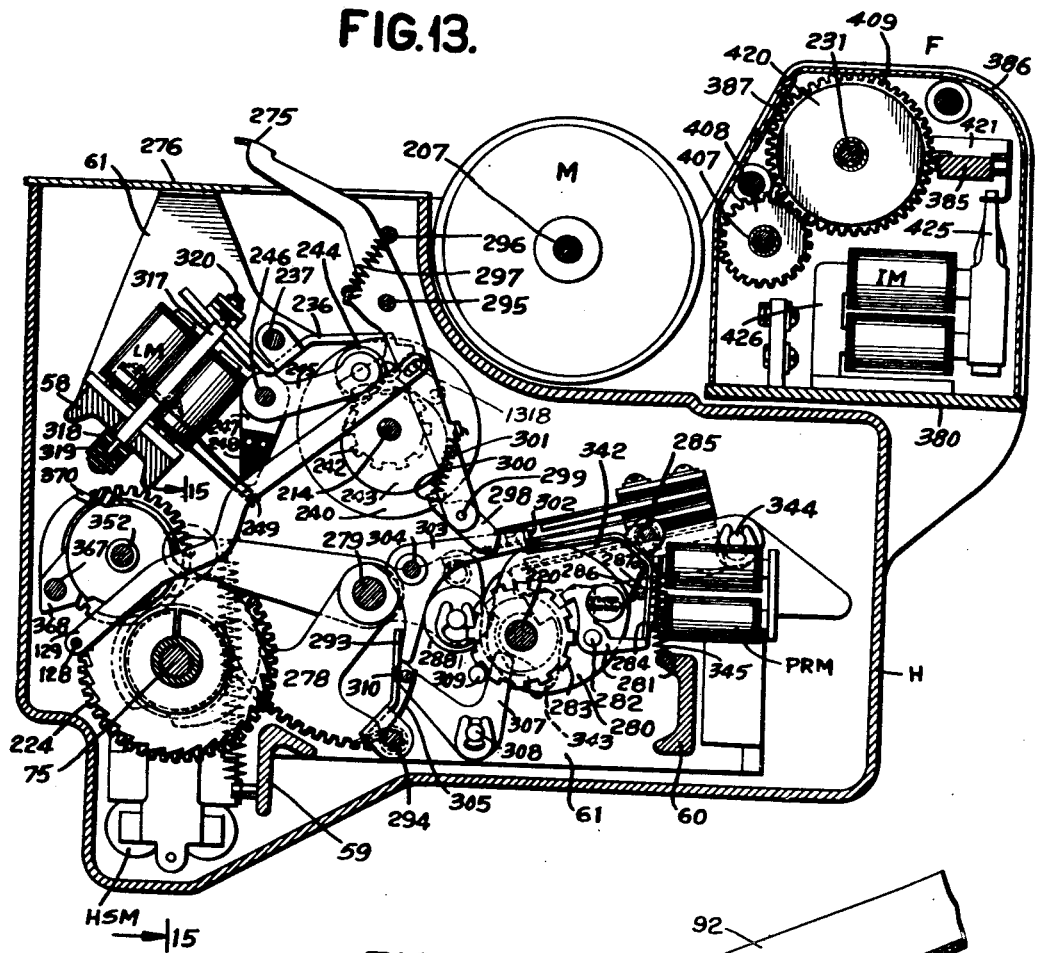
Fig. 13 is a right sectional view taken along the lines 13—13 in Fig. 11 and showing the line spacing and platen lifting mechanisms.

At the side of disk 240, Fig. 13, and fastened thereto, is a line space cam 243 which cooperates with a roller 244 on an arm 245 fastened to a shaft 246. Attached to the same shaft is another arm 247 tipped with an insulation finger 248 bearing against the top blade of a pair of contacts 249. Cam 243 is so shaped that shaft 246 is oscillated once each time the clutch is effective and the normally closed contacts 249 are opened near the midpoint of the cycle and again closed toward the end of the cycle.

Other contacts are closed by operation of magnet LM. Fitting into a hole in armature lever 236 is the end of a rod 317 the lower end of which is guided by an opening in boss 58 and bears down on an insulation piece over the middle blade of two pairs of contacts 318, 319. Contacts 318 are normally closed and contacts 319 are normally opened, but when magnet LM is energized, rod 317 is depressed to close contacts 319 and open contacts 318. The control exercised by these contacts is explained hereinafter with reference to the wiring diagram.

To the outer end of the shaft 246, Fig. 12, is attached another arm 250 formed with a slot 251 which is enlarged at the ends and in the center. Fitting into one of the enlarged openings in slot 251 is a shoulder on a knurled knob 252, Fig. 11, slidable on a screw 254 fastened to a line space pawl 253. The knob contains a compression spring which urges it towards the arm 250, but the knob may be grasped and pulled out of engagement with slot 251 and then adjusted to engage the shoulder of the knob with any of the three enlarged sections of the slot.

When pawl 253 is positioned on arm 250 as shown in Fig. 12, it is conditioned to impart three line spaces of movement to the platen. If the pawl is connected with the central enlarged opening in the arm 250, then, as the arm is depressed in operation, pawl 253 actuates the platen through two line spaces. When the pawl is connected to the slot opening near shaft 246, only one line space is caused by operation of the pawl.

The lower end of pawl 253 is confined by a bracket 255 on frame 57, and a spring 256 urges it into cooperation with a ratchet wheel 257, Fig. 15, which forms part of a platen driving tube 258 loosely pivoted on trunnion 75. The tube carries the inner race 259 of the ball bearing 77 in frame 57 and is formed with a driving gear 260. This gear 260, Fig. 11, meshes with a gear 261 on a hub 262 which is fastened to the platen shaft 67. Through the connections mentioned, counterclockwise operation of ratchet wheel 257, Fig. 12, is transmitted through gears 260 and 261 to turn shaft 67 and the platen in a clockwise feeding direction.

High speed feeding and ejecting devices

In order to save time in bringing a ledger sheet to the correct posting position, the machine is provided with means for turning the platen at a rapid rate. This high speed feeding means is controlled by the photo cell 551 (Fig. 3) so that as long as light through perforations 51 (Fig. 20) is sensed by the photo cell, the rapid mode of feeding remains in effect. When the last or bottom marginal perforation passes the aperture 571 in the cylinder 554, the high speed feeding devices are disconnected and the previously described line spacing devices are brought into action under control of the photo cell 550 which controls the energization of the line space magnet LM for a few steps of line spacing motion to bring sheet 50 up to the proper printing position.

The high speed drive is conducted through a friction clutch composed of gear 224 (Fig. 15) containing friction blocks 263 adapted to bear against a disk 264 attached to the driving tube 258. Gear 224 is wider than its driving gear 222 (Fig. 11) so that it may slide from side to side and yet remain in mesh. As explained hereinbefore, the platen driving tube 258 (Fig. 15) is loosely mounted on trunnion 75 and supported by ball bearings 77 and geared to the platen through gears 260 and 261 (Fig. 11).

The driving gear 224 (Fig. 15) is secured to a clutch operating collar 265 slidably mounted on the trunnion 75. The collar is formed with a groove 266 (Fig. 11) in which rides a roller 267 mounted on one end of an armature lever 268 pivoted at 269 on a bracket 270 attached to the side frame 57. Secured to the same bracket 270 is a high speed feed control magnet HSM in alignment with an armature block 271 fixed on the lower end of lever 268. A compression spring 272 (Fig. 15) coiled around the stud 273 fixed to bracket 270 bears against the lower end of lever 268 and tends to rock it in a counterclockwise direction (Fig. 11) to push the collar 265 towards the left to disconnect the clutch elements 263 and 264 (Fig. 15).

When energization of magnet HSM is initiated by means of the photo cell 551, it attracts the armature block 271 and rocks lever 268 (Fig. 11) in a clockwise direction to force collar 265 to the right and press friction blocks 263 against the side of disk 264. Thus the gearing connections to the motor M through gear 224 are frictionally connected to the platen driving tube 258 which continues in high speed operation as long as magnet HSM remains energized. As soon as the end of the column of marginal perforations 51 is sensed on the ledger sheet, the magnet HSM is deenergized and spring 272 acts to disconnect the high speed clutch.

The high speed driving connections are not only used to insert a sheet under control of photo cell 551 but they are also used to eject the sheet independent of photo cell control. For ejection the magnet HSM is energized by the group control devices whenever card group numbers change. The control of ejection is described more fully with reference to the circuit description.

*The platen raising and lowering devices*

The machine is provided with an automatic means for swinging the platen up and down under control of a platen control lever 275 (Figs. 13 and 14), projecting above a slotted table 276 fastened to the top of housing H and frame 57. The machine also contains electric controls for automatically operating the platen raising devices when the end of a ledger sheet is sensed. After the platen is so raised and a new sheet is inserted, operation of the tabulator and the sheet feeding devices is initiated by manipulation of lever 275 to lower the platen and automatically start feeding the ledger sheet under control of the perforations thereon, and initiate machine operations under control of the ledger sheet when it is in the correct printing position.

As explained hereinbefore, the platen may be raised and lowered by rocking bar 70 (Fig. 15) through an angle of about 180°. The left end of the bar is rocked on the trunnion 75 supported in bearing 76. Near the bearing is a gear 277 clamped to trunnion 75 and adapted to rock bar 70 when it is oscillated by a segment 278 (Figs. 13 and 14) loosely pivoted on a shaft 279. The sector is driven through a clutch mechanism on shaft 220, operated under control of a clutch releasing magnet PRM.

Loosely mounted on shaft 220 (Fig. 14) is a cam 280 carrying a clutch pawl 281 (Fig. 13) pivoted at 282. A spring tends to engage the pawl with a notched wheel 283 fastened to the drive shaft 220, but the pawl is prevented from moving in a counterclockwise direction by the end of an armature lever 284 pivoted on a stud 285 projecting from the side frame. A spring 286 attached to the armature lever 284 holds it against a stop pin 287a fixed to place the end of the armature in position to obstruct the end of pawl 281. However, when the platen raising magnet PRM is energized, the armature lever 284 is rocked in a counterclockwise direction and the clutch pawl is released to connect cam 280 to the drive shaft 220.

At the side of cam 280 (Fig. 14) and attached thereto is a notched operating collar 287 cooperating with a rearwardly extending arm on the sector 278. This arm of the sector is shaped with a projection 288 extending in the path of a shoulder 289 cut into the periphery of collar 287. When the clutch connection is made, collar 287 is driven positively in a clockwise direction and cooperates with the extension 288 to rock the sector 278 in a counterclockwise direction about shaft 279. This is done to start the operation of the gear 277 (Fig. 11) to rock the bar 70 and start the upward swing of the platen towards a raised position. After the initial inertia is overcome by this positive method of actuation, the further operation of the sector 278 is carried on by cooperation of the cam 280 (Fig. 14) with a roller 2881 pivoted on the side of the rearwardly extending arm of the sector.

The sector also carries a stud 289' cooperating with an insulation piece on the central blade 290 of a pair of contacts 291 and 292. When the sector is in its normal position, the stud 289' holds the blade 290 raised so that contacts 291 are closed and the contacts 292 are opened. However, as the sector is operated, stud 289' is lowered and contact blade 290 follows along therewith to close contacts 292 and open contacts 291. The posting interlocking control exercised by these contacts is explained hereinafter with reference to the wiring diagram.

After the cam 280 passes through a half revolution, the end of pawl 281 mounted thereon strikes against the top of an engaging lever 293 (Fig. 13) pivoted on the stud 294 in the side frame. Thus the clutch is disconnected to hold the cam 280 in a position wherein the high point of the cam cooperates with the roller 2881 to hold the sector 278 in a fully operated position wherein the parts are moved to such an extent that the platen is lifted to its extreme upward position. The platen is held in this raised position until the lever 275 is operated. A spring 305 urges lever 293 in a clockwise direction against a stop stud 310 for holding it in normal position.

The platen lowering control lever 275 is pivoted on a rod 295 and held in normal position against a stop rod 296 by a spring 297. The lower end of the lever carries a flipper 298 pivoted at 299 and held in position with a tab 300 thereon against the side of the lever as urged by a spring 301 attached to the lever. When the upper end of lever 275 is depressed, the lower end (Fig. 13) is moved to the right and a cam face on flipper 298 cooperates with a lug 302 formed on a bell crank 303 pivoted on rod 304. This lower vertical arm of bell crank 303 cooperates with the side of lever 293 to rock it in a counterclockwise direction to release pawl 281 and connect the clutch for continuance of its operation through the remaining 180°. The other horizontal arm of bell crank 303 and lug 302 overlies an extension on the armature of lever 284 so that operation of lever 275 serves to move both of the clutch pawl retaining means, with the effect that if the platen is raised when the lever is operated the platen will be lowered and if the platen is in its lowered printing position, it will be raised. When the platen operating clutch is in the middle of its operating cycle, a shoulder 306 on collar 287 (Fig. 14) cooperates with the side of the vertical arm of a bell crank 307 pivoted on a stud 308 extending from bearing plate 61. The forwardly extending arm of bell crank 307 overlies the stud 289' on sector 278 and the connections made through the bell crank 307 are in preparation for the restoring movement of the sector. A pin 309 (Fig. 13) limits the extent of movement of the bell crank 307 in a counterclockwise direction. When lever 293 is operated to again connect the clutch for continuance of the platen operating cycle to lower the platen, collar 287 (Fig. 14) through shoulder 306 actuates bell crank 307 in a counterclockwise direction causing it to push upwardly against stud 289' and start motion of the sector 278 in a clockwise direction. When once started towards its lowered position, the weight of the platen and its connections tends to carry the platen down at an accelerated speed but the rate of fall is controlled by the contour of cam 280.

When the platen is in the raised position with the pressure rollers separated therefrom, and the platen operating lever 275 (Fig. 13) is operated, connections are moved to release the holding means cooperating with the pressure rollers 102

(Figs. 11 and 16) so that they clamp the paper against the platen before the platen is lowered. A link 129 (Fig. 13) is slotted at its upper end and encircles a pin 1318 on the side of lever 275. The lower end of the link 129 carries the stud 128 which connects the link to the front end of the pressure roller latch 126 (Fig. 16). When lever 275 is operated, the link 129 is raised before flipper 298 cooperates with the lug 302 on bell crank 303. This is done in order that link 129 may release the pressure rollers 102 so that they may hold the ledger sheet 50 on the platen before the platen is lowered.

Devices are also provided to turn the platen and feed the sheet as it descends from the raised position to the print receiving position. This is done in order that the first posted item may be spaced below any heading data printed at the top of the ledger sheet. The number of line spaces that the sheet is to be fed in this manner is predetermined by the setting of a graduated disk 351 (Fig. 11) with connections to ratchet mechanism 373 for turning the platen as it is lowered. The head spacing mechanism is described in greater detail in Patent 2,297,743.

*The indicating mechanism*

The machine is provided with an indicator F (Fig. 2) to indicate the group number of the perforated record cards which are about to be analyzed by the tabulator. This group number corresponds to the ledger account number identifying the ledger sheet which the operator is supposed to insert in the machine before the related group of cards controls printing. The number is flashed when the platen is raised after the ejection of a ledger sheet, thereby conditioning the machine for the reception of a new ledger sheet and at the same time informing the operator regarding which sheet is to be selected for operation.

The tabulator is provided with a double set of sensing brushes. The upper brushes are used merely to machine control operation while the lower brushes control accumulation and printing in the usual way. Because of this form of construction, it is possible to operate such an indicator F under control of the upper brushes before the related group of record cards are analyzed for printing control under the lower brushes. The record cards are encountered first by the upper brushes and then by the lower brushes so that a group number may be read off the first card of an incoming group at the same time that printing is controlled by the last card of an outgoing group.

The indicating mechanism is mounted on a base 380 (Fig. 14) and located between a pair of side frames fixed to the base. Shafts 383, 384 and bar 385 act as bracing members between the side frames. A cover 386 conceals the mechanism, but is formed with a sight opening 387 through which the numerals on the indicator wheels may be observed.

The indicator unit comprises two sets of indicator wheels and two forms of driving mechanism. The one set of wheels is used to set up a number controlled by impulses emitted by the tabulator and directed through a magnetically controlled clutch. The other set of wheels is used to indicate the setting of the first mentioned set of wheels and it is driven by gearing connected to the platen raising mechanism. The indicator setting wheels and driving means therefor will be considered first.

It is noted hereinbefore in the description of the driving mechanism that the gear 227 (Fig. 12) is driven continuously as long as the motor M is energized. This gear forms part of a housing 388 containing the indicator clutch magnet ICM. Secured to the periphery of this housing 388 is a pair of conducting rings separated by insulation rings. The housing is loosely pivoted on a stud 403 extending from the side frame 57. Wiping on the rings as they are turned by gear 227 is a pair of brushes 391 which convey current to the rings so that wires may be lead from the rings to magnet ICM.

The magnet ICM forms part of a magnetic friction clutch comprising a plate which may be pressed against the side of housing 388 when the plate is attracted by the magnet. The energization of the magnet is timed to coincide with the time of operation of the tabulator during which the ten digit index points are analyzed on the record card.

Attached to the clutch plate is a driving wheel 395 loosely mounted on a sleeve extension of housing 388. The wheel 395 carries a set of four projections 400 adapted to cooperate with an armature latching lever 401 pivoted on a stud 402 on frame 57. Cooperating with latch 401 is an indicator release magnet IRM which, when energized, swings the latch counterclockwise out of the path of a projection 400 so that the magnetic clutch wheel 395 may be turned one step. This magnet is energized at regular intervals under control of circuit breaker contacts operated by the tabulator. Although the friction clutch tends to turn the pin wheel 395 through a greater arc than the quadrant between projections 400, the impulses control latch 401 so that the pin wheel is regulated in synchronism with passage of the record card in the tabulator so that each step of motion of the pin wheel coincides with the travel of the card between two successive index points in a column of the record card. Thus, the indicator mechanism is synchronized with the tabulator mechanism without any direct mechanical connections. Latch 401 vibrates back and forth ten times during the analysis of each record card.

The driving connections from the friction clutch continue from the wheel 395 and studs 396 thereon engaging a Geneva wheel 398, through a gear 404 attached thereto and in mesh with an idler gear 405 loosely pivoted on a stud 441 on frame 57. This gear 405 in turn meshes with a gear 406 attached to a shaft 407 leading into the indicator unit (Fig. 14).

Attached to shaft 407 are a series of ten indicator drive pinions 408 one for each indicator wheel. Each pinion meshes with teeth 409 on an outer shell 410 of an indicator setting wheel. Shell 410 is fastened to a hub loosely mounted over a bushing on the indicator operating shaft 231. This shaft and the bushings thereon do not play any part in the adjustment of the setting wheels; they are used merely as pivot stations for the loose hubs of the wheels.

A flange on wheel 410 contains a series of eleven holes aligned with a similar series of equally spaced holes arranged in a circle near the edge of an outer shell. In each aligned pair of holes in the shells there slides a setting pin with an enlarged head 417. There is a shoulder on the end of the pin opposite to head 417 to prevent the pin from slipping out of the shells.

The setting wheel with the pins 417 is turned in synchronism with the passage of the record card past the upper brushes of the tabulator by the gear connections to the magnetic clutch which is timed by release magnet IRM (Fig. 12) as already explained. Thus, the pins 417 are moved in succession past an operating bail 421 (Fig. 14) pivoted on the sides of bar 385. The bail is adapted to be swung on the bar so that a forward extension presses against the head of pin 417 and moves it in the shells so that the inner end is in the path of a stop on numeral bearing wheels 420 (Fig. 13). The bail is formed with a depending slotted end into which is inserted the end of an armature lever 425 operated by an indicator control magnet IM.

There is provided one such control magnet for each numeral exhibiting indicator drum 420. Magnet IM is energized under control of an upper brush in the tabulator when a perforation such as those representing the group number 746 (Fig. 9) on the card is brought under the brush.

When magnet IM is energized, lever 425 is attracted into contact with the upper core, and bail 421 is rocked to press the right end (Fig. 14) against the head of whichever pin 417 happens to be passing at the time, and thus shoves the pin into the path of the numeral wheel stop.

The pins 417 do not have any fixed numerical relationship with respect to the stop on numeral wheel 420. The indicating value of the operated pin depends on the time that it is operated, and that in turn depends on the location of the group number perforation in the record card. For example, if the group number is 9, the corresponding perforation is analyzed early in the cycle, magnet IM is energized early in the cycle, a pin is depressed early in the cycle and it then travels through almost a complete circle before being brought to rest after ten steps of movement of the setting wheel. When a zero perforation is analyzed, the operated pin 417 travels only one step away from bail 421 before shell 410 is brought to rest by the completion of the impulse actuation of magnet IRM. Pins 417 are restored by a fixed wire which projects into the path of the pins and cams them out to normal position.

The pins 417 are set up on every listing and tabulating cycle of the machine but the setting is only used for actual indication after a change in group number, at which time a ledger sheet is ejected and the platen is raised for the insertion of another ledger sheet.

When the platen is raised, the raising clutch shaft 220 (Fig. 12) is turned 180° in a counterclockwise direction and the sprocket 228 thereon is turned a half revolution. The other sprocket 230 connected to sprocket 228 by chain 229 is turned a complete revolution in the same direction. Shaft 231 connected to sprocket 230 is also turned one revolution in the same direction.

Mounted on shaft 231 (Fig. 13) are bushings with shoulders for the loosely mounted indicator wheels 420. Between each pair of bushings there is keyed to the shaft friction devices which press against the inner wall of wheel 420 and tend to turn the wheel with shaft 231. The wheel turns until the stop therein strikes a depressed pin 417 which locates it in the proper numeral indicating position.

The platen raising and drum turning operation always occurs at the end of a cycle at which time the pin setting wheels of the indicator are at rest.

The construction and mode of operation described with respect to one wheel and one set of indicating elements is the same for all ten indicators. In the higher orders of the indicator where no perforations are sensed in the card, a zero impulse is automatically initiated at the proper time to push the pins 417 so that the wheels of the related orders indicate zero.

The foregoing sections of this description deal mainly with the general record controlled operation of the machine and the control of ledger sheet insertion, location and ejection. There follows hereinafter the disclosure of the coded balance printing and reading devices and the co-ordinated controls between these devices and the sheet feeding means.

*Balance printing devices*

Figure 10:
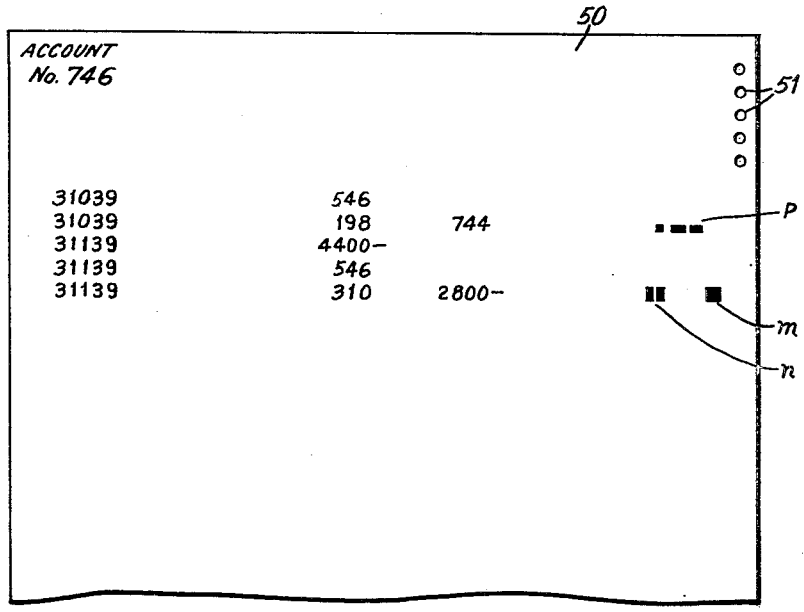
Fig. 10 shows a ledger sheet bearing five lines of print, two of which are balance indicating impressions recorded in code near the right side of the sheet.

When a change in group numbers is sensed, a total printing operation is initiated during which the balance amount is not only recorded numerically, but also recorded by code markings that are impressed on the ledger sheet and shaped in different digital outlines to be representative of the balance amount. Referring to Fig. 10 it is seen that to the right of the positive balance amount 744 there appears three marks $p$ which are code representations of the digits 744. Below the marks $p$ are two other rectangular code marks $n$ which are so positioned that they are representative of the second balance amount 2800. The square code mark $m$ associated with marks $n$, indicates that the last balance is a minus balance as further denoted by the minus sign near the numerical recording of the amount 2800.

Figure 19:
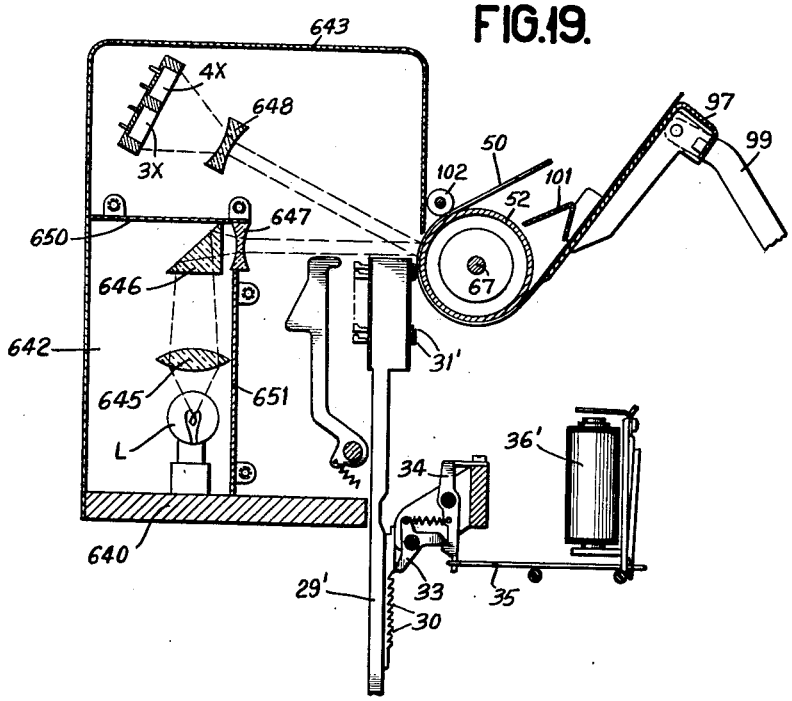
Fig. 19 is a sectional view showing the photoelectric devices for reading the balance code representations on a ledger sheet.
Figure 20:
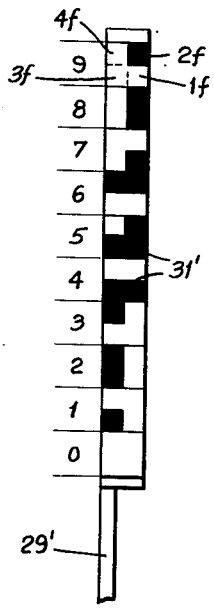
Fig. 20 is a detail view of the type faces on a balance code typebar.
Figure 22:
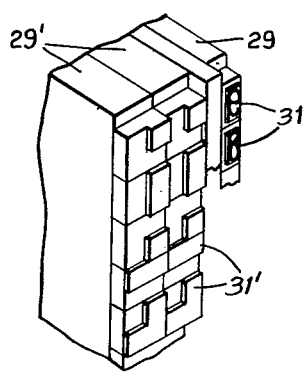
Fig. 22 is a perspective view of portions of code bars shown adjacent part of a regular numeral typebar.

In Fig. 20 is shown the code type 31' on one of the series of typebars 29' with which the balance representations are recorded. These code typebars are controlled by magnets 36' (Fig. 19) and latch mechanisms 30, 33, 34 and 35 that are the same as the numerical print control previously described, the only difference being that the type 31' appear as seen in Figs. 20 and 22. There it is seen that various digital code outlines are obtained by the extension of one or more of the four quarter sections of each typeface. A coded representation of "1" is printed by the extending quarter section at the lower left of the corresponding typeface. The amount "2" is printed in code by the two joined and extended quarter sections at the left of the third type from the bottom. In a similar fashion the other digit typefaces are composed of one or more square quarter sections which extend in distinctive formations.

The impression of the code figures on a ledger sheet is performed during total taking at the same time that the numeral total figures are printed and just before the sheet is ejected. The same balance reading impulses that pass through the accumulator commutators to the numeral print magnets 36, also surge through the code print magnets 36'.

Figure 21:
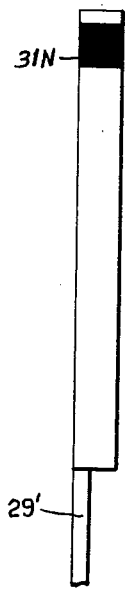
Fig. 21 shows the type face on the entry control bar.

The special code type 31N, Fig. 21, is stopped in printing position only when a negative balance is to be recorded. The large square mark not only indicates the nature of the balance, but it also controls balance reading devices to cause the accumulator to work subtractively when the accompanying balance is entered.

After total printing, the sheet is automatically ejected so that another sheet may be inserted to correspond with the new incoming group of record cards which are about to be analyzed. Later, when the indicator again flashes the group number of the first sheet, it may be reinserted to add and subtract other items with the balance recorded thereon. Immediately after the reinserted sheet is properly positioned by the feeding controls, a reading of the coded balance is taken automatically and the amount added or subtracted in an accumulator before the cards are sensed to enter the new items in the same balance accumulator. Card feeding is suspended during the sheet inserting and balance reading operations, but it is automatically called into play after the balance is accumulated.

The photocell devices for reading the balance in code

The code spot reading devices are mounted on a base 640 (Fig. 19) and between a pair of side frames 641 and 642 (Fig. 2) that are fastened to the machine in front of the bank of ten code printing bars 29'. A casing 643 covers all sides of the photocell reading unit except where the typebars and platen move, which is the end open toward the dark interior of the machine.

Mounted on the base is a lamp L the light from which is focused in a narrow band on the sheet 50 by means of a rectangular lens 645 through which the rays of light pass before being reflected by a prism 646 and directed through another rectangular lens 647 and against the sheet. The place where the light strikes the paper is directly above the code typebars in the position occupied by code marks such as $m$ and $n$ (Fig. 10) just after reinsertion of the sheet. After striking the code section of the sheet, the light is reflected back at an angle through a lens 648 (Fig. 19) which acts to expand the rays so that they fall on one or more of four photocells in each denominational position. The number of photocells $1x$, $2x$, $3x$ and $4x$ (Fig. 2) affected by light in each position depends on the shape of the code marking in that order. Since each of the four photocells is related to one of the quarter sections $1f$, $2f$, $3f$ and $4f$ (Fig. 20) on the type 31'; one, two or three of the photocells will be unaffected when the related quarter sections of the effective type print a darkened mark to prevent light from reflecting into the various photocells. From observation of Fig. 20 the various light blocking effects of the code marks are apparent. There it is noted that the zero position of the code bar does not result in any mark, therefore all four photocells receive light in an order representing zero.

At the right of the code reading unit (Fig. 2) is a large photocell 649 which is provided to detect the appearance of the code mark $m$ made by type 31N (Fig. 21) to distinguish negative balances from positive balances.

Between side plates 641 and 642 are separation plates 650 and 651 for preventing light from reaching the photocells from places other than the ledger sheet.

The electrical control devices

Figure 24A:
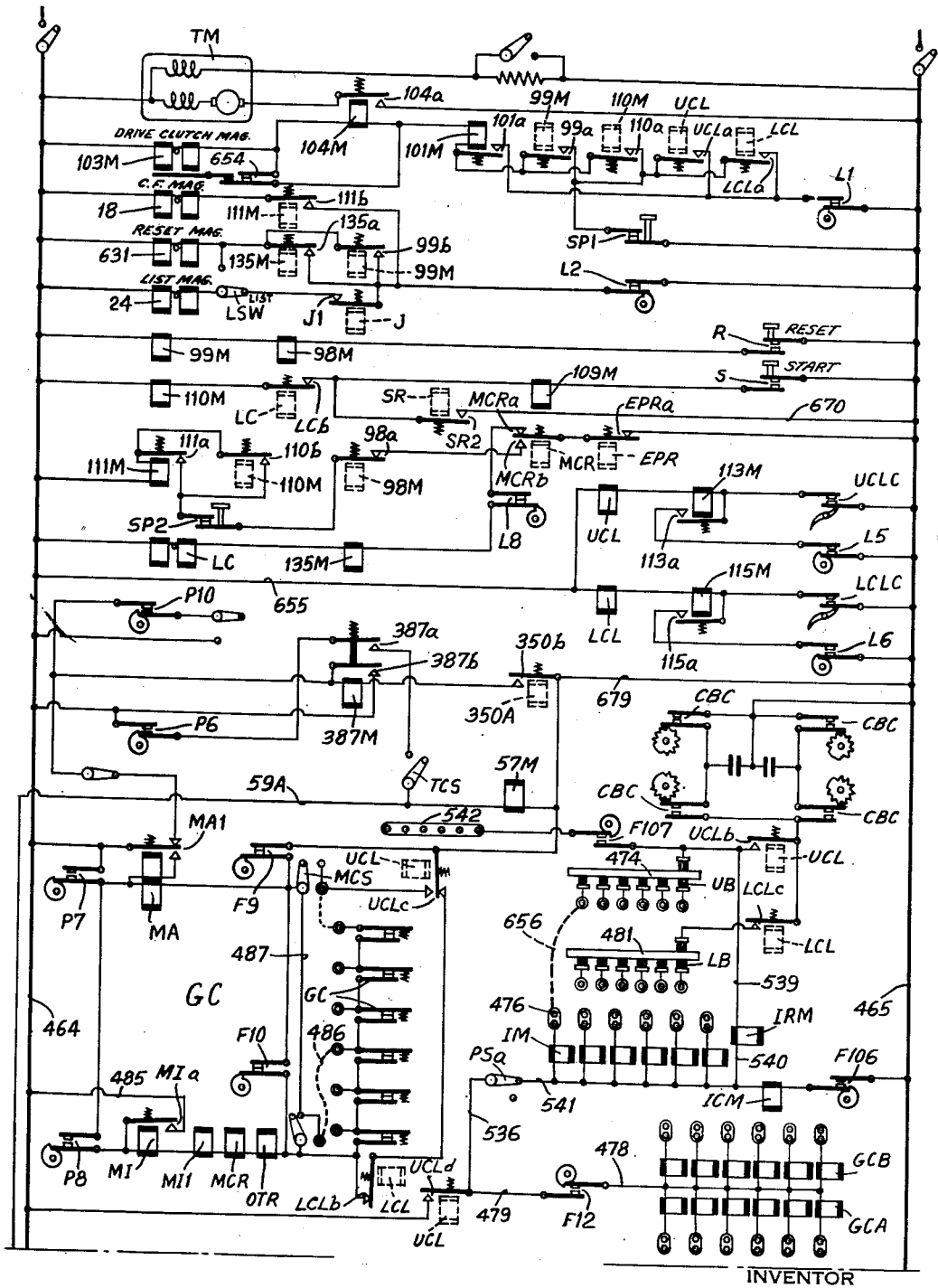
Figure 24B:
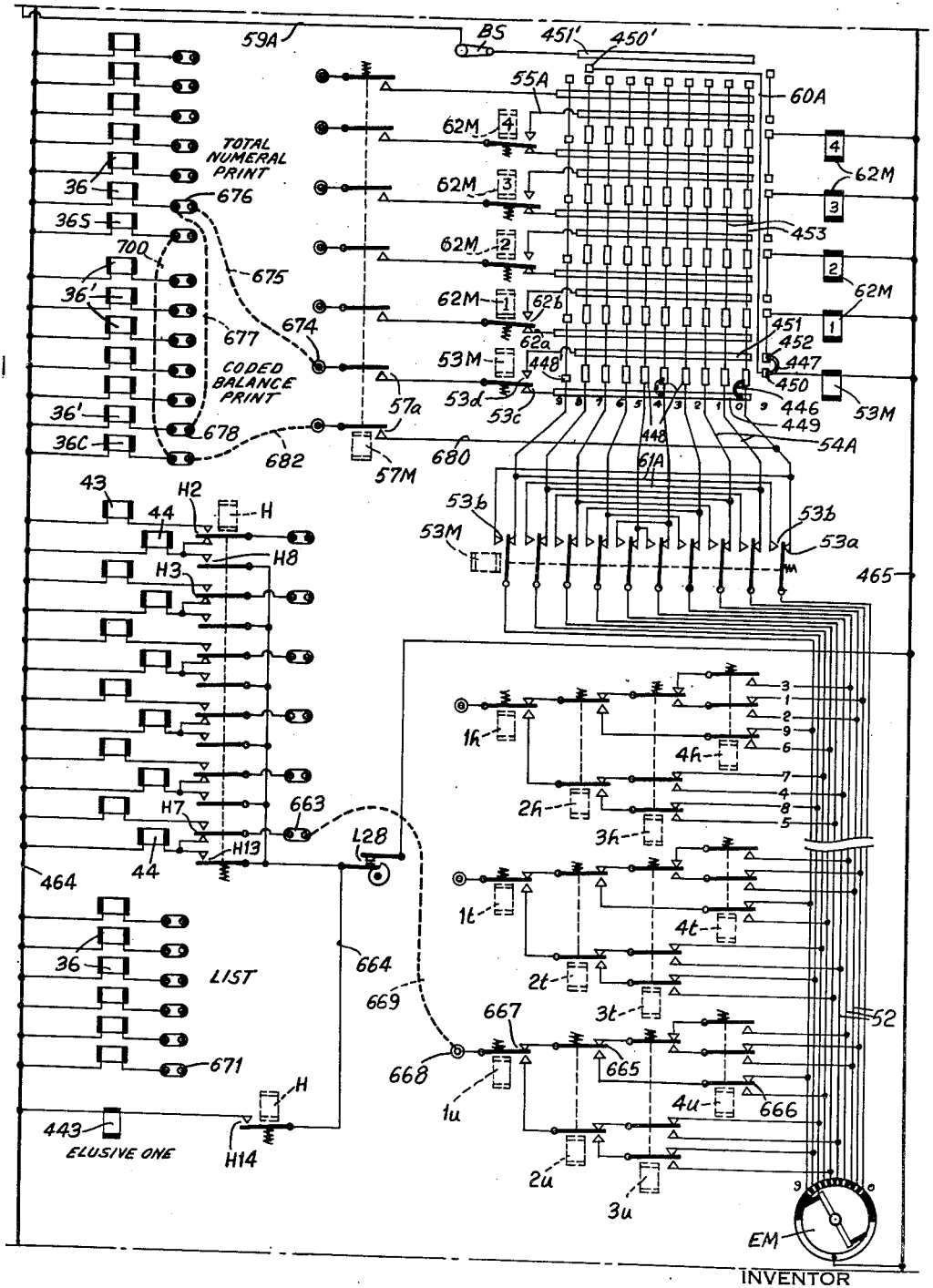
Figure 24C:
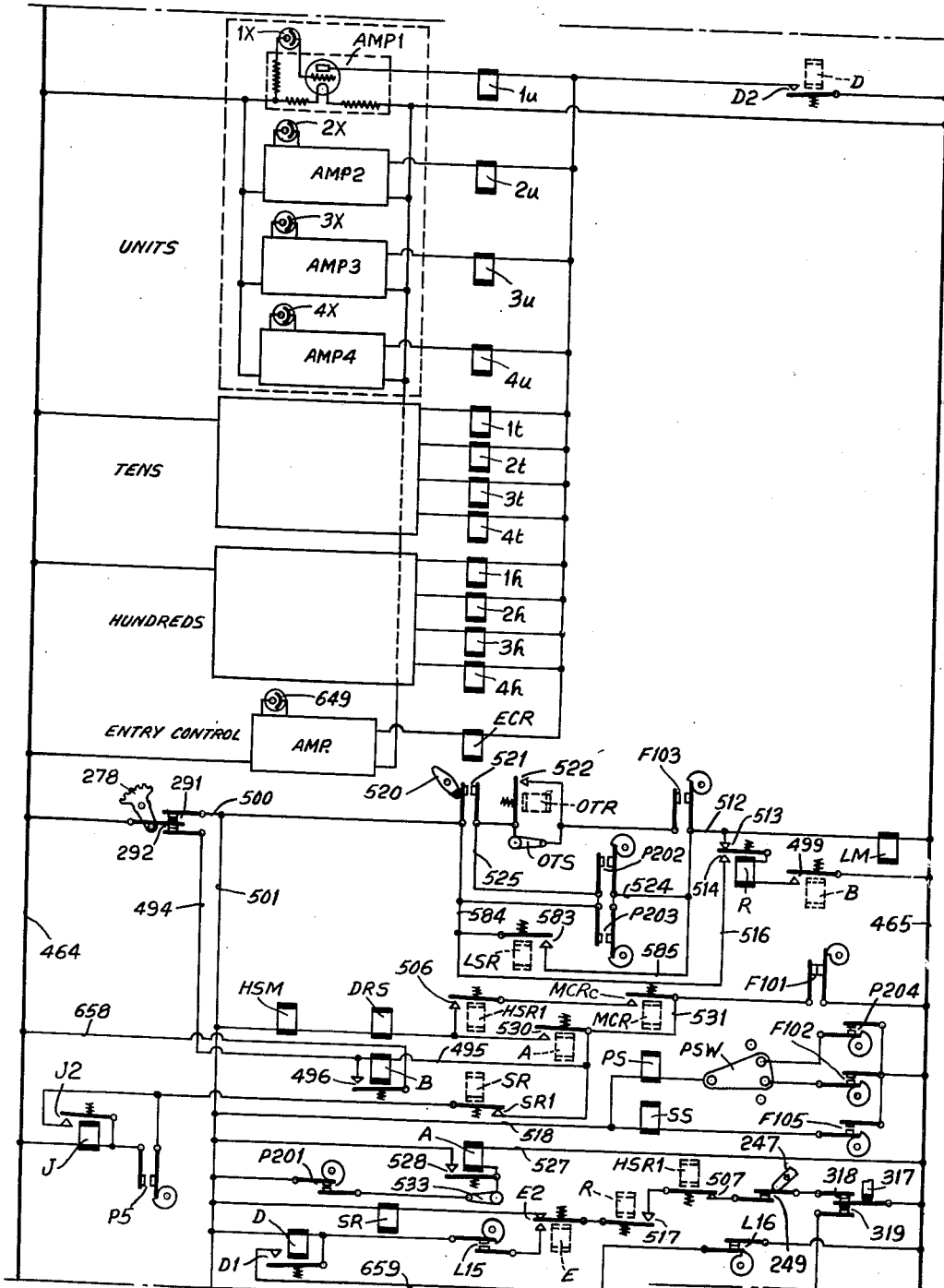
Figure 24D:
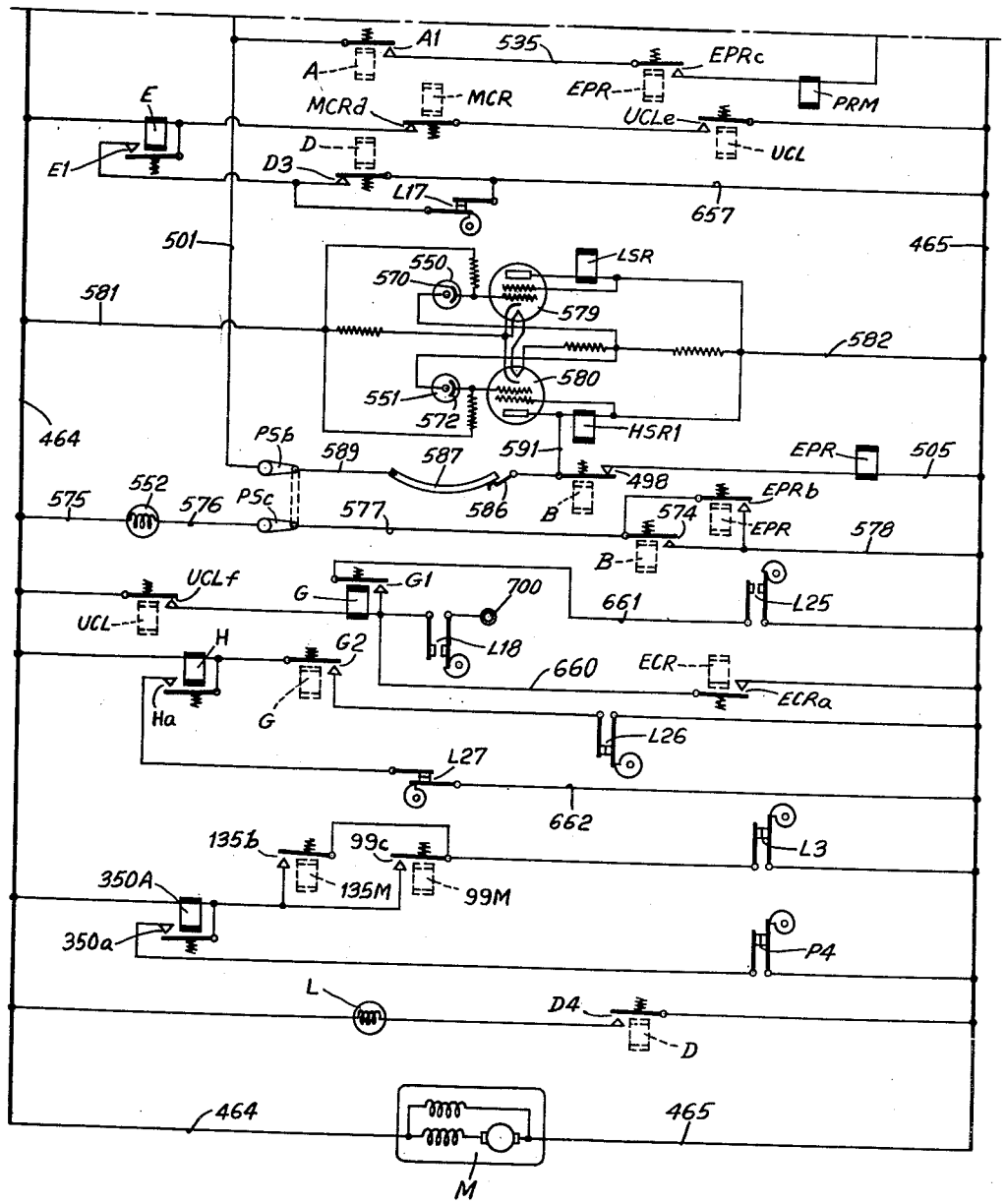

Reference may be made to Figs. 24a, 24b, 24c and 24d for an understanding of the electrical controls of the machine and carriage as well as the connection therein of the balance entry controls. The wiring shown in Fig. 24a is generally of the form of Patent 2,126,621 with the exception of the group control devices. The upper part of Fig. 24b relates to the balance accumulator readout controls while the lower end reveals labyrinth circuits for balance entry from the code spot sensing means. The top of Fig. 24c shows the photocell sensing and amplifying orders of the code analyzer, while the bottom of the figure and Fig. 24d are concerned mainly with the ledger sheet feeding controls.

To condition the machine for a normal operation, it is first necessary to take a total and reset cycle. This is accomplished by depressing the reset key. Upon depression of the reset key, the reset contact R is closed and completes a circuit through relays 98M and 99M as follows: from one side of the line 464, through relay coil 99M, through relay coil 98M, through reset contact R to line 465, thus energizing the two relays mentioned. Energization of relay 98M causes the relay contact 98a to open and thus prevent a card feeding cycle when the reset key is depressed. The energization of relay 99M causes its associated contacts 99a, 99b and 99c (Fig. 24d) to close. Closure of contact 99a (Fig. 24a) completes a circuit through the drive clutch magnet 103M as follows: from line 464, through the drive clutch magnet coil 103M, through the contact 654, through relay coil 101M, through the now closed contact 99a, through the stop key contact SP1 to line 456. Energization of the drive clutch magnet 103M engages the main drive shaft 6, Fig. 1, with the motor TM, Fig. 24a. Energization of relay 101M causes contact 101a to close and complete a holding circuit for itself and the drive clutch magnet back through the cam contacts L1. The operation of the drive clutch magnet armature upon being attracted, causes the contact 654 to open, thus opening the shunt circuit around the relay coil 104M and permitting said relay to operate and close its associated contacts 104a. The closure of contacts 104a completes a circuit through the main drive motor TM.

Closure of contacts 99b, as previously mentioned, completes a circuit through the reset magnet 631 as follows: from line 464, through the reset magnet coils 631, through the now closed contact 99b and through cam contact L2 to line 465. The energization of the reset magnet engages the accumulator resetting mechanism to the main drive shaft, thus causing the accumulators to be reset. At the same time a circuit is completed through the list magnet 24 as follows: from line 464, through the list magnet 24, through the list switch LSW thrown to list position, through the normally closed contact J1 and through cam contact L2 to line 465. Thus, upon depressing the reset key R, a total print and reset cycle is initiated.

Closure of contact 99c (Fig. 24d) completes a circuit through the balance reading control relay coil 350A as follows: from line 464, through the relay coil 350A, through contact 99c now closed, through cam contact L3 to line 465. Energization of the relay 350A causes its associated contacts 350a and 350b to be closed. The closure of contact 350a completes a holding circuit for the relay 350A back through the cam contact P4 to line 465.

Closure of contact 350b (Fig. 24a) completes a circuit through relay coil 387M as follows: from line 464, through the normally closed MA1 contact, through relay coil 387M, and through the closed contact 350b to line 465. Energization of the relay coil 387M closes its associated contacts 387a and 387b. With the switch TCS set at its closed position, and upon closure of contact P6, a circuit is completed through a balance print control magnet 57M as follows: from line 464, through cam contact P6, through contact 387a now closed, switch TCS, through magnet coil 57M and line 465. Energization of magnet 57M closes contacts 57a (Fig. 24b) and completes balance print control circuits from the accumulator readout units to the total and code print magnets 36 and 36', as described in greater detail hereinafter.

During the total print and reset cycle, the cam contacts P7 and P8 close. Closure of P7 completes a circuit through the major control relay coil MA as follows: from line 464, through cam contact P7, through lower relay coil MA, and cam contacts F9 to line 465. The energization of relay MA causes its associated contact MA1 to shift and establish a holding circuit for itself as follows: from line 464, through the now transferred contact MA1, through lower relay coil MA, through the F9 cam contact to line 465. Closure of cam contact P8 completes a circuit through a series of relays as follows: from line 464, through cam contact P7, through cam contact P8, through relay coils MI, MI1, MCR, and OTR, through the F10 cam contact, and through the cam contact F9 to line 465. Energization of relay MI sets up a holding circuit for itself and the above-mentioned relays by the closure of its associated contact MI$a$ as follows: from line 464, through contact MI$a$ now closed, through the MI, MI1, MCR and OTR relay coils, through cam contact F10, through cam contact F9 to line 465. The energization of relay coil MCR causes the associated contact MCR$a$ to open and contact MCR$b$ to close. It might here be stated that the L cam contacts function whenever the drive motor is operating, the F cam contacts only function during card feeding operations, and the P cam contacts function only during reset and total printing operations. The cams for operating the contacts are fixed on shafts having the proper periods of action. The L cams are on a constantly rotating shaft, the F cams are on a card feed shaft, and the P cams are fixed to a resetting shaft.

Near the end of the first cycle, cam contact L1 opens, thus dropping out the holding circuit through the relay coil 101M and the drive clutch magnet 103M. The machine is now conditioned ready to start feeding cards and controlling item entry in the normal manner.

Assuming that cards have been properly placed in the card feeding hopper, the operator now depresses the start key thus closing the start key contacts and completes a circuit through relay coils 109M and 110M as follows: from line 464, through relay coil 110M, through the normally closed contact LC$b$, through relay coil 109M and start key contacts to line 465. Energization of relay coil 110M causes associated contacts 110$a$ and 110$b$ to close. Closure of contact 110$a$ completes a circuit through the drive clutch magnet 103M as follows: from line 464, through the drive clutch magnet, through the contact 654, through relay coil 101M, through contact 110$a$ now closed, and through the stop key contact SP1 to line 465. As previously described, upon energization of the drive clutch magnet 103M the contact 654 opens, thus causing the relay 104M to operate and again start the drive motor TM operating. Likewise, a holding circuit is established through contact points 101$a$ as previously explained.

Closure of contacts 110$b$ completes a circuit through the relay 111M as follows: from line 464, through relay coil 111M, through contact 110$b$ now closed, through the stop key contact SP2, through contact 98$a$, through contact CR$b$ now closed, and thence through contact EPR$a$ to line 465.

Energization of relay 111M causes its associated contacts 111$a$ and 111$b$ to close. Closure of contact 111$a$ establishes a holding circuit for the relay 111M as follows: from line 464, through relay coil 111M, through contact 111$a$ now closed, to the stop key contact SP2, through contact 98$a$, through the shifted contact MCR$b$, and through contact EPR$a$ to line 465. Closure of contact 111$b$ completes a circuit through the card feed clutch magnet 18 as follows: from line 464, through the card feed clutch magnet 18, through contact 111$b$ now closed, through cam contact L2 to line 465. With the circuits just described in operation, the feeding of cards is performed.

As the first card is fed from the hopper through the card feeding mechanism, the upper card lever contact UCLC is closed just before the leading edge of the card enters under the sensing brushes UB at the upper station. Upon closure of the upper card lever UCLC, a circuit is completed through the upper card lever relay UCL and the relay 113M as follows: from line 464, wire 655, through relay coil UCL, through relay 113M and the closed contacts UCLC to line 465. The energization of relay 113M sets up a holding circuit for itself and the relay UCL through the associated contact 113$a$ and cam contact L5 to line 465. Thus, as long as cards are feeding through the feed unit, relay UCL and relay 113M will be maintained energized by the overlapping condition between cam contact L5 and the UCLC contacts. The energization of the relay UCL causes its associated contacts UCL$a$, UCL$b$, UCL$d$, UCL$e$, and UCL$f$ to close and causes the contact UCL$c$ to be shifted. As a card passes the upper brushes UB, information recorded therein is sensed by the upper brushes and certain functions are performed which will be described hereinafter.

Near the end of the second card feed cycle, the lower card lever contact LCLC is closed and completes a circuit through the relay LCL and relay 115M as follows: from line 464, wire 655, through relay coil LCL, through relay coil 115M, through the now closed contact LCLC to line 465. Energization of the relay 115M completes a holding circuit for itself and the lower card lever relay through contact 115$a$ and cam contact L6 to line 465. The lower card lever relay LCL and relay 115M will be maintained energized as long as cards are being fed, in a manner similar to that for the upper card lever relay.

The energization of the upper card lever relay causes the closure of contact UCL$a$ which completes a holding circuit for the drive clutch magnet 103M as follows: from line 464, through the drive clutch magnet 103M, through the relay 104M, through the relay coil 101M, through contact 101$a$, through the contact UCL$a$ now closed and through the stop key contact SP1 to line 465. Thus, the drive clutch magnet 103M will be maintained energized as long as cards are in the card feeding mechanism. A parallel holding circuit is set up through contacts LCL$a$ which is closed upon energization of the lower card lever relay LCL. This circuit maintains the drive clutch magnet energized until the last card has passed the lower sensing brush station. Just prior to the closure of the lower card lever contact, cam contacts F9 and F10 open and, in a manner which will later be described, the relays MA, MI, MI1, MCR and OTR are deenergized. The deenergization of relay MA allows associated contact MA1 to restore to normal, thus opening its holding circuit. In a like manner, the deenergization of the relay MI allows the contact MI$a$ to restore to normal and thus open the holding circuit for the MI, MI1, MCR and OTR relays. The deenergization of relay MCR allows the associated contacts to restore to normal. Thus, the contact MCR6 is opened and contact MCRa is closed. Opening of contacts MCRb opens the circuit through the relay 111M, thus causing the associated 111a points to restore to normal. The opening of contact 111b opens the circuit through the card feed clutch magnet 18, thus causing the card feeding mechanism to stop at the completion of the second card feed cycle. The closing of contact MCRa completes a circuit through the relay coil LC and the relay coil 135M as follows: from line 464, through relay LC, through relay 135M, through cam contact L8 now closed, through contact MCRa also closed and contact EPRa to line 465. Energization of the relay LC causes contact LCb to open and thus prevent operation of magnet 110M and the card feed unit by depression of the start key while a total and reset cycle is functioning. The energization of relay 135M causes closure of contact 135a and completion of a circuit through the reset clutch magnet 631 as follows: from line 464, through the reset clutch magnet 631, through the contact 135a and cam contact L2 to line 465. Closure of contact 135b (Fig. 24d) completes a circuit through the relay 350A as follows: from line 464, through the relay coil 350A, through contact 135b and cam contact L3 to line 465. Energization of relay coil 350A sets up a holding circuit for itself back through contact 350a, cam contact P4 and line 465. The energization of relay 350A also closes contact 350b (Fig. 24a) and sets up the circuit for total printing in the manner previously described. With the starting cycles completed and the cards in position, the machine is ready for listing items.

The succeeding operations may be summarized before explaining them in detail. As the first card passes the upper brushes UB, group number data is sensed and used to control the indicating mechanism, thus indicating to the operator the ledger number for the group of cards which is about to be fed past the lower adding control brushes. This group or ledger number is associated with a ledger sheet which the operator selects from the posting file and places on the tray 82 (Fig. 2) above the platen. After the ledger sheet has been properly placed on the tray 82, the lever 275 is depressed, the platen 52 is lowered, and the ledger sheet is fed automatically to the next printing position. After the ledger sheet is at the proper printing position, the code marks of the previous balance is read from the ledger sheet and entered into the balance accumulator. Then, the card feeding operations are automatically initiated and the item amount information recorded on these record cards for this group is combined with the previous balance and a new balance is obtained. Upon detection of a group change, a total and reset cycle is initiated and the new balance is then listed on the ledger sheet in numerical figures as well as in code marks. The group control holding and operating circuits are similar to those set forth in detail in Patent 1,976,617. In the group control circuits, the pickup or sensing portions are of the kind set forth in Patent 1,933,349 as explained hereinafter.

While item printing operations are carried on, the indicating mechanism is operated in synchronism with the sensing of the record cards. The indicator clutch magnet ICM (Fig. 24a) is held energized by the closure of cam contacts F106 during the period of machine operation wherein index points are sensed on the record cards. The circuit through clutch magnet ICM includes line 464, contacts UCLd, wire 538, switch PSa, magnet ICM, contacts F106, and line 465.

Although the friction clutch is held in constant operation during the sensing period of the cycle, it is effective only at distinct intervals under control of the circuit breaker contacts CBC which operate the indicator release magnet IRM by a series of impulses. The impulses directed to magnet IRM follow a path through line 465, contacts CBC, contacts UCLb wire 539, magnet IRM, wires 540, 541, switch PSa, wire 536, contacts UCLd and line 464.

At the same time, the indicator pin setting magnets IM are operated under control of impulses directed through the upper brushes cooperating with the ledger account number and group control perforations in the record card. The differentially timed impulses are directed through the upper brushes along a line of wiring including line 465, circuit breaker contacts CBC, contacts UCLb, contact roller 474, upper brush UB, plug wire 656 to plug socket 476, indicator magnet IM, wire 541, switch PSa, wire 536 and contact UCLd to line 464. The higher order indicator magnets IM which are not connected to the upper brushes are connected to plug sockets 542 in line with cam contacts F107 which close at the zero index point to operate the indicator pin corresponding to the indication of the number "0." This is done to fill out the higher orders of the indication. Although the indicator control pins are set by magnets IM on every operation of the machine, the indicator wheels are controlled thereby only when the platen is raised as explained hereinbefore.

After the selected ledger sheet is inserted, lever 275 (Fig. 14) is operated to initiate automatic positioning of the sheet. Upon depression of the lever 275, platen 52 is lowered, the sector 278 is operated, contact 292 is opened and contact 291 is closed as previously described. After the platen has reached its extreme lower position, light from the light source 552 (Fig. 5) falls through the marginal perforations and upon the photocells 550 and 551 (Fig. 24d) energizing relays HSR1 and LSR. Energization of relay HSR1 causes contact 506 (Fig. 24c) to be closed, and when the cam contact F101 closes, a circuit is completed through the HSM and the DRS magnets as follows: from line 464, through contact 291 now closed, through magnet HSM, through coil DRS, through contact 506, through contact MCRc now closed, and through contact F101 to line 465. Energization of magnet HSM causes the high speed paper feeding mechanism to function. Energization of coil DRS causes rocking of levers 335 and 332, Fig. 12, and a detent roller 331 is moved away from the platen gear 261 during high speed feeding of the paper. When the last perforation 51 in the record sheet 50 passes out of line with photocell 551, the light is blocked from impinging on this photocell, thus causing relay HSR1 to be deenergized and open its associated contact 506, thus causing the circuit through the HSM and DRS coil to be opened. Line spacing is then effective in the following manner. The light impinging on the photocell 550 through the perforations 51 in the record sheet 50 causes relay LSR (Fig. 24d) to be energized, causing contact 583 (Fig. 24c) to be closed. Closure of contact 583 completes a circuit through line space control magnet LM as follows: from line 464, through contact 291 now closed, through contact 583, wires 585 and 512, and through magnet coil LM to line 465. Energization of magnet LM causes the ledger sheet to be spaced line by line until the last perforation in the record sheet 50 passes out of alignment with photocell 550, thus preventing light from impinging on the photocell and causing relay LSR to be deenergized. The ledger sheet is now positioned in the proper posting position and ready to receive impression on the next printing line. However, printing is not started immediately because, when balance entry control is desired, time must be allowed for sensing and accumulating the old balance.

A pair of relays E and D are provided to hold up the restarting of the card feed and initiate balance reading. These relays are set up when a group change occurs, prior to the time that the new sheet is inserted. When a change in group numbers is sensed, contact MCR*d* (Fig. 24*d*) is closed by control relay MCR and, if cards are being fed, contact UCL*e* is also closed and a circuit will be completed through relay E as follows: from line 464, through relay coil E, through contacts MCR*d* and UCL*e* to line 465. Energization of relay E sets up a holding circuit for itself by the closure of contact E1 thus completing the holding circuit as follows: Line 464, relay E, through contact E1, through contact D3 and wire 657 to line 465. Energization of the relay E also causes a contact E2 (Fig. 24*c*) to be shifted to prevent immediate restarting by relay SR, and instead call in relay D for balance reading.

After a control break occurs, the usual total print and reset cycle takes place and at the completion this cycle, should any ledger sheet be on the platen it is ejected and upon ejection, the platen is lifted and contact 292 is closed and 291 is opened. This condition is maintained until a new sheet is entered. The closure of contact 292 completes a circuit through a relay B in the following manner: From line 464, through contact 292, wire 494, relay B, and through the cam contact F101 (now closed), to line 465. The energization of relay B completes a holding circuit for itself by the closure of contact 496 as follows: From line 464, through wire 658 and contact 496, through relay coil B, wires 495, 531 and through the cam contact F101, to line 465. The energization of relay B also causes contacts 499 and 574 to close and contacts 498 to open. The relay B is maintained energized until the cam contact F101 is opened which occurs in the first card feeding cycle after a total print and reset cycle. Upon insertion of the new ledger sheet, the LSR and HSR1 relays are energized in the manner previously described. The energization of relay LSR causes closure of contact 583 (Fig. 24*c*) and completes a circuit through the line spacing magnet LM in the manner previously described. At the same time, a circuit is completed through a relay R in the following manner: From line 464, through the contact 291 (now closed) wires 500, 584, through contact 583, wire 585, through the contact 513, through relay R and contacts 499 (now closed) to line 465. The energization of relay R causes the contacts 513 to open and contacts 514 to close and complete a holding circuit for relay R as follows: From line 464, through contact 291, wires 500, 584, 516 and through contact 514, through relay coil R, through the contacts 499, to line 465. The energization of relay R also causes closure of the contact 517. Relay R will remain energized until the holding circuit for the B relay is broken, at which time relay B will be deenergized, thus causing the contact 499 to open and open the holding circuit for relay R. From the foregoing it is apparent that relay B calls relay R into operation. And now it will be explained how relay R with relay E make relay D effective for balance reading.

When the ledger sheet has been fed to the proper printing position, the contacts 318 and 249 will be closed after the last line space operation, contact 517 will be closed by relay R, and contact E2 will be shifted. Upon closure of the cam contact L15, a circuit will be completed through relay D as follows: From line 464, through contact 291, through wires 500, 501 and relay D, through cam contact L15, through the shifted points E2, through contacts 517, 507, 249 and 318, to line 465. Energization of relay D causes contact D1 to be closed to complete a holding circuit for relay D back through wire 659 and cam contact L16 to line 465. The energization of relay D also causes contact D2 to be closed and contact D3 (Fig. 24*d*) to be open. Closure of contact D2 completes the circuit to line 465 from the common side of the sets of balance reading relays shown at the top of Fig. 24*c*. The opening of contact D3 (Fig. 24*d*) places the holding circuit for relay E under control of cam contact L17 so that the holding circuit for relay E will be opened when cam contact L17 opens. Shortly thereafter, cam contact L16 opens (Fig. 24*c*) deenergizing relay D. Relay D is maintained energized for one cycle after the ledger sheet has been properly positioned in the ledger posting carriage to allow time and control the circuits so that the coded balance record on the ledger sheet may be read and entered into the balance accumulator.

In order to determine if the balance on the ledger sheet is to be entered into the balance receiving accumulator additively or subtractively, a light responsive photocell 649 (Fig. 2) is provided at the extreme right-hand position in line with the special code type 31N in the code printing unit. If it is to be entered subtractively, a spot or square mark *m* (Fig. 10) will appear at the extreme right of the coded balance on the ledger sheet. Thus when analyzing the balance, no light will be reflected on the light responsive photocell 649 and the associated relay ECR (Fig. 24*c*) will be energized. Energization of relay ECR causes contact ECR*a* to be closed and completes a circuit through a relay coil G as follows: From line 464, through the contact UCL*f* (now closed), through relay G, wire 660 and through contact ECR*a* to line 465. Energization of relay G closes contact G1, thus completing a holding circuit for itself back through wire 661 and contact L25 to line 465. The energization of relay G causes contact G2 to be closed, thus completing a circuit through relay coil H as follows: From line 464, through relay H, through contact G2, through the L26 contact to line 465. Energization of relay H causes a contact H*a* to close and complete a holding circuit back through the cam contact L27 and wire 662 to line 465. The energization of relay H causes the contacts H2—H7 (Fig. 24*b*) to be shifted and the contacts H8—H14 to be closed. The shifting of contacts H2—H7 opens the circuits from the plug hubs 663 to the add magnets 44 and completes the circuits from the plug hubs to the subtract magnets 43. The closure of contacts H8—H13 completes a circuit through cam contact L28 so that all of the add magnets will be energized at the 9 index point position as usual in this type of subtraction accumulator. The closing of contact H14 completes the circuit through L28 and wire 664 to energize elusive unit magnet 443 for complement completion as explained in detail in Patent 1,976,617.

Of course, if no spot is sensed such as mark $m$, it is an indication that the balance is a positive one and relays ECR, G and H remain ineffective and contacts H2—H7 remain as shown to effect an ordinary adding operation by energizing add magnets 44 at differential times as governed by the balance code reading photocells $1x$—$4x$ (Fig. 2) of the various denominational orders.

The nature of the balance is sensed early in the cycle following the positioning of the ledger sheet, and as the cycle continues, an emitter EM directs impulses into the accumulator, Fig. 17, which is of the single balance readout type disclosed in Patent 2,007,375. The emitter brush holder is geared to a continuously rotating shaft for operation in list and total cycles.

The negative nature of an item amount is revealed by a special perforation which is punched in the record card bearing the amount. The same relay G mentioned hereinbefore is used to detect the appearance of a negative item and thereby condition relay H and the accumulator for subtraction. The special perforation is sensed by an upper brush which is plugged to socket 700 (Fig. 24d) and contacts L18 in line with relay G.

Referring to Fig. 20, the code markings for the digits 1 to 9 are shown appearing on the type faces 31' of a code printing type bar 291. That is, for a 9 digit, the type face is divided into four sections identified as $1f$, $2f$, $3f$ and $4f$, and printing is effected only in section $2f$; for an 8 digit, printing is effected in sections $1f$ and $2f$; for a 7 digit, printing is effected in zone $1f$ only, and so forth. Thus, in order to analyze these coded digits printed on the ledger sheet, means is provided to determine which zones have been printed. With reference to Fig. 19 it is seen that when the ledger sheet 50 is positioned at the upper unprinted posting line position, the old balance markings are located above the type so that the light from the light source L is concentrated on the code marks by means of the lens system 645, 646 and 647. The light is then reflected from the ledger sheet, up through the lens 648, and impinges upon the light sensitive elements $1x$, $2x$, $3x$, and $4x$ also shown in Fig. 24c. The amplifiers AMP1—AMP4 to which these light sensitive elements are connected are so arranged that when light is obstructed or prevented from impinging upon the light sensitive element, the relay $1u$—$4u$ associated with that particular amplifier is caused to be energized, but if light is allowed to impinge on the light sensitive element, the associated relay does not energize. The photocells or light sensitive elements $1x$—$4x$ are arranged so that the area of a particular coded spot printing position is coincident therewith and receptive to light reflected back through the lens 648 onto one or more of said four light sensitive elements associated with that printing position. Thus, if in the units coded spot printing position a 9 is recorded, the zones $1f$, $3f$ and $4f$ will reflect light to the respective light sensitive elements $1x$, $3x$ and $4x$, and because of the fact that zone $2f$ is darkened indicating a 9, no light is reflected back onto the light sensitive element $2x$. Thus, when the relay contact D2 is closed, the relay $2u$ will be energized. Energization of relay $2u$ closes its associated relay contact 665 shown in Fig. 24b, causing the contact to be shifted from the position shown. When the brush of the emitter EM passes the 9 segment, a circuit will be completed as follows: From line 465, through the emitter EM, through the 9 segment of the emitter, to the normally closed contact 666, through contact 665 now closed, through the normally closed contact 667, to the plug hub 668, and thence by plug wire 669 to the plug hub 663, through an adding or subtracting magnet 44 or 43 according to whether the balance is to be entered additively or subtractively, and then to line 464, causing the amount 9 to be entered into the units order of the accumulator. In a similar manner, all of the other coded digits of the balance recorded on the ledger sheet are analyzed and combinations of the groups of four magnets $1t$—$4t$, $1h$—$4h$, etc., are energized to close various paths between the emitter EM and the higher denominational orders of the accumulator to enter all of the balance amount.

After the amount entering part of the balance entry cycle is past, contacts L16 open (Fig. 24c) and relay D is deenergized. Relay D then permits contacts D2 to open and deenergize all the photocell controlled relays. Relay E (Fig. 24d) is deenergized shortly before relay D is energized, because contacts L17 open before contacts L16 open to deenergize relay D and close contacts D3.

Following the entry of the balance and upon opening of contacts L17 (Fig. 24d), relay E is deenergized and allows the contact E2 (Fig. 24c) to be restored to its normal position. Since the contacts 517, 507, 249 and 318 are still closed, upon restoration of contact E2 to its normal position, a circuit is completed through the start relay SR as follows: from line 464, through the closed contacts 291, wires 500, 501, through relay SR and through the normally closed contacts E2, 517, 507, 249, 318 to line 465. Energization of relay SR opens contact SR1 and closes contact SR2 (Fig. 24a).

Opening of contact SR1 (Fig. 24c) opens the holding circuit for relay J, thus allowing a related contact J1 (Fig. 24a) to be closed to complete a circuit through the list magnet 24. The setting up of relay J was brought about on the previous total cycle when contact P5 closed to complete a circuit including line 464, relay J (Fig. 24c), contacts P5, through contacts SR1, wire 531, and contacts F101 to line 465. Relay J when energized establishes a holding circuit for itself through the contacts J2 arranged in shunt around cam contacts P5. By means of this circuit, the list magnet 24 was withheld from operation by the opened contacts J1 which were held so during the balance reading cycle subsequent to sheet insertion.

Closure of the other contact SR2 (Fig. 24a) completes a circuit through the relay 110M to initiate card feeding operations in the following manner: from line 464, through relay 110M, through contact LCb, through contact 461 closed in shunt around start key contacts S, and then through wire 670 to line 465. Energization of relay 110M initiates card feeding operation and item entering in a manner previously described.

Items are accumulated under control of magnets 43 and 44 (Fig. 24b) which are energized differentially by impulses controlled by the movement of the record cards under the lower brushes LB. At the same time, and under control of the same brushes, printing is controlled by energization of magnets 36. A typical adding and printing circuit may be traced from line 465 (Fig. 24a), through circuit breaker contacts CBC, card lever contact LCLc, contact roller 481, the perforation in the record card, brush LB, plug wire to socket 663 (Fig. 24b), magnet 44, and branching through another plug wire to socket 671, the circuit also passes through print magnet 36 and then to line 464.

During the first item entering cycle, the solenoid SS is energized to permit the punch holding frame 133 to slide to a position wherein the punch plunger is in line with the marginal perforations in the ledger sheet, thus taking the perforations out of line with the feed control photocells. Cam contacts F105 (Fig. 24c) close momentarily to energize the solenoid early in the operation. The circuit through solenoid SS may be traced from line 464, to contacts 291, wires 500, 501, and 518, solenoid SS, contacts F105 and line 465.

The punch operating solenoid PS is energized on every item entering cycle during listing. Cam contacts F102 are closed to control the punching of a marginal perforation along with each printed item. The circuit through solenoid PS may be followed from line 464, through contacts 291, wires 500, 501, 518, solenoid PS, switch PSW, contacts F102, to line 465.

The ledger sheet 50 is spaced after every item printing operation. Late in every listing operation a pair of contacts F103 close to direct a line spacing impulse through magnet LM. The listing feed control circuit includes line 464, contacts 291, wire 500, contacts 521, switch OTS, contacts F103, wire 512, magnet LM and line 465. When the machine is used for tabulating as distinguished from listing work, lever 520 is set to open contacts 521 so that cam contacts F103 are ineffective, and then contacts P203 are used to energize magnet LM for every total printing operation. The circuit may be followed from line 464, through contacts 291, wire 500, contacts P203, wires 525 and 512, magnet LM and line 465.

After the old balance has been entered into the balance computing accumulator and certain other information is derived from the record cards, a new balance is created; the entry of the item amount information from the record cards taking place after the entry of the balance appearing on the ledger sheet. A new balance is then printed numerically and in code on the ledger sheet and the sheet is ejected from the machine. Ejection of the ledger sheet is initiated at the end of a total print and reset cycle which is first initiated by a group control change.

The automatic group control devices are of the form disclosed in the Smith Patent 1,933,349. In brief, this form of auto control functions as follows: if the control perforation appearing at the upper brush station agrees with the control perforation appearing at the lower brush station for the same column of successive cards, both of the control magnet coils GCA and GCB (Fig. 24a) are energized simultaneously and, due to the structure of the cooperating mechanism, the associated control contact GC will not be opened. However, if the perforation appearing at the upper brush station does not agree with the perforation at the lower brush station, the control coils GCA and GCB will not be energized simultaneously and, when either of these coils is energized separately, the associated control contact GC is opened to cause a break in the control circuit to deenergize the control magnets MI, MII, MCR and OTR.

During a total cycle, the balance amount is printed numerically and in code under control of the accumulator commutator devices shown in Fig. 17 and disclosed in detail in Patent 2,007,375. These devices are adapted to control printing so that the balance is represented in true numbers and code representations of true numbers irrespective of whether the balance number is a positive amount representative of a credit balance, or a complemental amount representative of a negative or debit balance.

The complete connections of a few orders of the commutator devices between the impulse emitter EM and the total print magnets 36 and 36' are shown in Fig. 24b. There it is seen that numeral and code mark printing are brought about simultaneously by the same impulses through cross plugging wires, such as wires 675 and 677 to the units order print magnets 36 and 36'. Thus, a total amount such as the positive balance amount 744 (Fig. 10) will be printed at the same time as the code marks p.

The manner in which a credit balance is printed under control of the emitter and commutator devices will first be explained. When the number in the accumulator is a true number, it is to be printed directly in the same form, and for this operation brushes 446 alone are utilized and a series of parallel circuits are completed therethrough in each order where the brushes 446 are positioned to represent a significant figure. An explanation of a single example will suffice to make the operation clear.

Assume that in the units order the brush 446 is set to represent a "4" as shown in dotted lines wherein it touches the "4" segment 448 and conductor 449 of the units order. The type bearing elements are moving past the printing position in synchronism with the movement of the emitter EM, so that as the "4" type reaches the printing position the emitter brush reaches the "4" segment, and a circuit is completed which is traceable as follows: from line 465, through emitter EM, "4" wire 52, "4" contacts 53a, "4" wire 54A, "4" segment 448 in the units order, brush 446, conductor 449, contacts 53c, contact 57a now closed, plug socket 674, plug wire 675, socket 676, plug wire 677, and through both print control magnets 36 and 36' to the line 464. Energization of the magnets at this time will intercept the associated type bars in position to print the numeral 4 and the code designation representative of the amount 4.

Contacts 57a are closed under control of a relay 57M (Fig. 24a) which is energized throughout the type selecting portion of the printing cycle through a circuit completed by closure of cam contacts P6. The circuit is from line 464, through contacts P6, contacts 387a, switch TCS, relay 57M and wire 679 to line 465.

When the accumulator holds a negative balance, it is represented by a complemental amount which is to be printed as a true number. For such operations both commutator brushes 446 and 447 are used, the latter carrying a printing control impulse through a lower order, the commutator setting of which is to be complemented to 10, and the former effecting control through higher orders which are complemented to 9.

Considering first the digits to be complemented to 9, it will be realized that in the highest order the brushes stand at "9" and brush 447 bridges segment 450' and conductor 451' causing the completion of a circuit traceable from line 464 (Fig. 24a), through cam contact P6, contacts 387a, switch TCS, wire 59A, switch BS (Fig. 24b), conductor 451', brush 447, segment 450', wire 60A, magnet 53M and line 465. Energization of magnet 53M causes opening of contacts 53a and closure of contacts 53b. This action causes a reversal of the circuit connection between the wires 52 and 54A in accordance with a 9's complementary arrangement. Impulses will, therefore, be emitted through the segments 448 and through conductors 449 in inverse order so that, as the "9" type elements are in printing position, the "0" segments and brushes 446 carry an impulse, and so on, until finally as the "1" type element reaches printing position, the "8" segments 448 receive an impulse.

Magnet 53M not only shifts contacts 53a and 53b for inverting the impulses directed through the higher orders, but it also shifts contacts 53d so that in the lowest order, should the order contain a significant digit, the brush 447 is selected to carry a 10's complement reading through the conductor 451 instead of carrying the impulse selected by the 9's complement brush 446. Other magnets 62M are provided to perform a similar function in the higher orders when they are selectively brought into action by related brushes 447 standing as positioned by accumulator wheels at 0. Each of these relays 62M is associated with related contacts 62b which may be closed for negative balance reading to invert lower order complement amounts to 10's complements through brushes 447 so that a true number representation may be printed. At the same time that the lowest order brush 447 is positioned at zero, as shown, other progressively higher order brushes 447 may also stand at zero and when they do so bring one or more of the magnets 62M in circuits parallel with the circuit through magnet 53M. The lowest order brush 447 at zero calls into play both magnets 53M and lowest order magnet 62M. Tens order brush 447 when at zero calls hundreds order magnet 62M into action. The activated magnets 62M open contacts 62a leading to the nines complement conductors 449 and close contacts 62b leading to the tens complement conductors 451, as explained in Patent 2,007,375.

Whenever a negative balance is printed as shown in Fig. 10, a minus sign is printed at the right of the numerical representation, and the square code mark $m$ is printed at the right of the balance code representations $n$. These signs are printed under control of the sign printing magnets 36S and 36C (Fig. 24b). They are connected by a plug wire 700 and through another plug wire 682 to a wire 680 attached to the "0" line 54A which is of no effect when contact 53a remains closed during the printing of a positive balance. However, upon the printing of a negative balance, relay 53M is activated and opens contacts 53a but closes contacts 53b so that wire 680 is then in effect connected to the 9's segment of the emitter EM. When the figures of the negative balance are printed, a "9" impulse then passes through wire 680 and over through sign printing control magnets 36S and 36C to stop the related special type bars in position to print the signs pointed out with reference to Fig. 10.

The zeros in the lower orders are printed under control of the usual zero pawls cooperating mechanically with the type bar which prints the first significant figure on the right and thereby controls the positioning of the bars to its right in the zero printing position.

At the end of the total cycle, after the balance has been printed, a cam contact P201 is closed to initiate the ejection of the ledger sheet. A circuit is completed from line 464 (Fig. 24c) through contact 291, wires 500, 501, contact P201, switch 533, through a relay coil A and wire 527 to line 465. Energization of relay A completes a holding circuit for itself by the closure of contact 528. A circuit is then set up through line 464, contact 291, wires 500, 501, through the now closed contact 528, through relay A and wire 527 to line 465. The energization of relay A also causes contacts 530 and A1 to close. Closure of contact 530 completes a circuit through the high speed sheet feeding control magnet HSM and the detent release solenoid DRS as follows: From line 464, through contacts 291, wires 500, 501, through magnet HSM, through coil DRS, through the closed contact 530, wire 531, through cam contact F101 to line 464. The energization of magnet HSM engages the feed clutch and causes the ledger sheet to be ejected. When the end of the ledger sheet passes between the contact 506 and the segment 507 (Figs. 6 and 24d) a circuit is completed through the end of paper relay EPR as follows: From line 464 (Fig. 24c) through contact 291, down wires 500, 501 and through the switch PSb (Fig. 24d) the segment 507, contact 506, through contact 498 now closed and through relay EPR to line 465. Energization of relay EPR opens the contact EPRa (Fig. 24a) thus preventing card feeding operations while the ledger sheet is being ejected.

The energizing of relay EPR also closes contact EPRc (Fig. 24d). With contact 319 closed, a circuit will be completed through the platen raising magnet PRM as follows: Line 464, through contact 291, wires 500, 501, through the closed contact A1, through the closed contact EPRc, through coil PRM and through the contact 319 to line 465. Energization of magnet PRM causes the platen raising mechanism to function and raise the printing platen in a manner previously described.

The contact 319 is closed upon energization of magnet LM which is caused to operate in the following manner. After the high speed ejection circuit is set up in the manner previously explained, the ledger sheet blocks the light beam to the line space photocell 550 (Fig. 24d) until the end of the sheet passes by, thus allowing the beam to act upon the cell 550. The photocell then operates relay LSR through the amplifying tube 579. Closure of associated contact 583 completes a circuit through magnet LM as follows: From line 464, through contact 291, wires 500, 584, the contact 599, wires 585, 512 and magnet LM to line 465.

With the sheet ejected, the indicator displaying the account number of the incoming items, and the platen raised, the machine is ready for the insertion of the related ledger sheet and repetition of the automatic feeding, balance reading, balance accumulating, item accumulating and new balance printing operations already described.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a record controlled machine for printing items on ledger sheets, said sheets bearing feed control indicia marking the progress of printing thereon and code marks representing an old balance amount, the combination with record feeding means, of record sensing means, an accumulator, item printing devices, means for sensing the code marks on said sheets, means under control of said feed control indicia for feeding a reinserted sheet in position to resume item print reception wherein said code marks are aligned with said code sensing means and the first blank printing position is aligned with said printing means, means under control of said code sensing means for entering said old balance amount in said accumulator, means for preparing said code sensing means for operation, other means under control of said sheet feeding means for delaying operation of said code sensing and entering means until the sheet has been fully reinserted, and means under control of said preparing and delaying means for automatically starting operation of said record feeding, record sensing and item printing means after the old balance amount has been entered, and means under control of said record sensing means for operating said amount entering means and said item printing devices to accumulate the amounts and print the record data, starting with said first blank printing position, on the sheet bearing the old balance.

2. In a record controlled machine for printing items on ledger sheets, said sheets bearing feed control indicia marking the progress of printing thereon and code marks representing an old balance amount, the combination with record feeding means, of record sensing means, an accumulator, item printing devices, means for sensing the code marks on said sheets, means under control of said feed control indicia for feeding a reinserted sheet in position to resume item print reception wherein said code marks are aligned with said code sensing means and the first blank printing position is aligned with said printing means, means under control of said code sensing means for entering said old balance amount in said accumulator, means under control of said sheet feeding means for calling said code sensing and balance entering means into operation after said sheet has been fully reinserted, means rendered effective following said balance entering operation for automatically starting operation of said record feeding, record sensing, and item printing means after the old balance amount has been entered, and means under control of said record sensing means for operating said amount entering means and said item printing devices to accumulate the amounts and print the record data, starting with said first blank printing position, on the sheet bearing the old balance.

3. In a machine controlled by item amounts on records and by code marks representative of a total amount on a record sheet, said sheet bearing feed control indicia placed thereon to mark the progress of printing and being removed after receiving one or more lines of print and later reinserted to receive other lines of print, the combination of means for feeding the records, a sheet supporting means for receiving and holding said sheet, an accumulator, means for sensing the records, means under control of said sensing means for entering amounts in said accumulator, sheet feeding means for advancing said sheet supporting means, means for sensing said feed control indicia, code mark reading devices, means under control of said indicia sensing means for controlling said feeding means to feed the sheet until the code marks are aligned with the code reading devices and the last indicium is one space beyond the sensing position to bring the sheet in position to receive a printed impression on a line directly under the last line of print, means under control of said sheet feeding means for making said code reading devices effective automatically after the end of the feeding operation, means under control of said code reading devices for operating said amount entering means of said accumulator for entering into said accumulator the amount represented in code on said sheet, means rendered effective following the accumulation of the code amount, and means under control of the last mentioned means for automatically initiating operation of said record feeding means and entry of item amounts from the records.

4. In a record controlled machine for reading code marks on a code area of a record sheet, said sheet bearing feed control indicia placed thereon to mark the progress of printing, and having, in combination, a data accumulating means, a source of light, means for directing the light against said code area on the record sheet, a set of photocells, one for each section of said area, and arranged in the path of light reflected therefrom to be influenced according to the presence or absence of printed marks, an amplifying means associated with each photocell, a set of relays, one for each photocell and related amplifier and controlled thereby, an impulse emitter and a series of circuits each representative of a different digit, means under control of said relays for selecting one of said circuits to be effective to control the accumulating means to add the code amount data, means for sensing data on record cards, means under control of said sensing means for controlling said accumulating means to enter said data therein, means for controlling the operation of said source of light, means for controlling the operation of said photocells, amplifying means and relays, means under control of said feed control indicia for positioning said record sheet to present under said source of light the code marks last printed, sequence control devices operated by said positioning means as an incident to the completion of operation thereof for automatically calling into operation said light controlling means and said photocell controlling means for addition of the code amount, a timing control device, and means under control of said timing device to cause actuation of said record card sensing means for causing entry of data from the record cards into said accumulating means to follow automatically after the control of the accumulating means by said photocell relays.

5. In a machine controlled by record cards and by code marks designating balance amounts on a record sheet, said sheet bearing feed control indicia, in combination, a balance accumulator, means for sensing item amount indicia on said record cards, means for entering said amounts in said accumulator, means for placing said entering means under control of said sensing means, means for sensing said feed control indicia, a sheet feeding means, a source of light, means under control of said feed indicia sensing means for controlling said sheet feeding means to feed the sheet until the code marks are positioned for cooperation with said source of light, means for directing the light against the code marked area of the record sheet, photoelectric means for analyzing said code marks, means under control of said photoelectric analyzing means for controlling said entering means of said balance accumulator to enter therein the balance amount represented on said sheet, means under control of said feeding means for rendering said source of light and said photoelectric means effective automatically after the end of the feeding operation to enter the balanced amount, sequence control devices cooperating with the last mentioned means, and means under control of said devices for calling said record card sensing means into operation to cause item entries into said accumulator to follow automatically after a balance entering operation therein.

6. In a record card controlled machine for printing data derived from the record cards on ledger sheets and reinserting said sheets for further data printing operation, said sheets bearing data printed in code and feed control indicia, in combination, devices for sensing said feed control indicia, code reading devices, sheet feeding devices controlled by said indicia sensing devices to bring an inserted sheet in position with the printed code data aligned with said code reading devices and ready to be printed upon in a blank line directly under a line of previously printed data, means for feeding said cards in succession, means for sensing data representations on said cards, means under control of said sensing means for printing on said sheet, an accumulator, means under control of said card sensing means for adding data in said accumulator, means operable as an incident to completion of operation of said sheet feeding devices in reinserting the sheet for disabling said printing means for one cycle and initiating operation of said code reading devices, means under control of said code reading devices for controlling said adding means for entering the data printed in code into said accumulator, a timing control means cooperating with the last mentioned means, and means under control of said timing means for automatically initiating operation of said card feeding means and printing of items on the sheet after said code data entering operation, whereby the data derived from the first card is printed on the sheet in said blank line.

7. In a machine controlled by groups of data bearing cards for printing items on ledger sheets corresponding to the groups, each sheet bearing feed control indicia and code marks representing an old balance amount, the combination with means for feeding said cards, of means for sensing the data on said cards, an accumulator, item printing devices, means under control of said sensing means for operating said accumulator and said devices to enter the amounts and print the data on the cards on a related ledger sheet, means for sensing said feed control indicia, means for sensing said code marks, means under control of said indicia sensing means for feeding and locating a reinserted sheet in position to resume item print reception, and wherein said code marks are aligned with said code sensing means, group control devices, means under control of said code sensing means for controlling said accumulator operating means for entering said old balance amount in said accumulator, contacts in series with the means for sensing code marks, a relay for operating said contacts, a holding circuit for said relay, a number of contacts in series with said relay, one of said number of contacts being closed near the end of each cycle, another of said number of contacts momentarily opened but again allowed to close under control of said feeding means upon the insertion of a sheet, other of said number of contacts being closed under control of said feeding means upon location of said sheet in posting position, second and third control relays, another of said number of contacts being operated by said second relay, said second relay being energized under control of said third relay, which is brought into operation under control of said feeding means as an incident to the ejection of the previously printed ledger sheet, a fourth control relay, and another of said number of contacts operated by said fourth relay, contacts operated by the group control devices, said fourth relay being in series with said contacts which are operated by the group control devices as an incident to detection of a group change and the consequent printing of a new balance on the previous sheet, whereby operation of said old balance entry controlling means is automatically initiated upon insertion and proper positioning of a ledger sheet and prevented at other times.

8. In a machine controlled by groups of data bearing cards for printing items on ledger sheets corresponding to the groups, each sheet bearing feed control indicia and code marks representing an old balance amount, the combination with means for feeding said cards, of means for sensing the data on said cards, an accumulator, item printing devices, means under control of said sensing means for operating said accumulator and said devices to enter the item amounts and print the item data on the cards on related sheets, means for sensing said feed control indicia, means for sensing said code marks, means under control of said indicia sensing means for feeding a reinserted sheet in position to resume item print reception and wherein said code marks are aligned with said code sensing means, group control devices for initiating a total taking operation, means under control of said code sensing means for controlling said accumulator operating means for entering said old balance amount in said accumulator, a magnet for initiating operation of said item printing devices, contacts in series with said magnet, a relay for operating said contacts to prevent item printing operation, contacts in series with said relay and operated under control of said group control devices as an incident to a total taking operation, a holding circuit for said relay, normally closed contacts in series with said holding circuits, a second relay for operating the last mentioned contacts, contacts in series with said second relay, a third relay for opening said last mentioned contacts under control of said group control devices, and means for deenergizing said third relay as an incident to a balance entering operation and late in the cycle involving such an operation whereby the second mentioned relay is made effective to deenergize the first relay and permit the magnet to function to initiate operation of said item printing devices directly after the old balance is entered.

JAMES W. BRYCE.